US009785934B2

(12) United States Patent
Davis et al.

(10) Patent No.: US 9,785,934 B2
(45) Date of Patent: Oct. 10, 2017

(54) FACILITATING SAME DAY PAYMENT TRANSACTIONS

(71) Applicant: Facebook, Inc., Menlo Park, CA (US)

(72) Inventors: Stephen Moore Davis, San Francisco, CA (US); Michelle Vautier Chernyavsky, Los Gatos, CA (US); Vipan Reddy Raja Nalla, San Jose, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/098,124

(22) Filed: Apr. 13, 2016

(65) Prior Publication Data

US 2016/0224967 A1    Aug. 4, 2016

Related U.S. Application Data

(63) Continuation of application No. 14/572,275, filed on Dec. 16, 2014, now Pat. No. 9,342,831.

(51) Int. Cl.
*G06Q 40/00* (2012.01)
*G06Q 20/26* (2012.01)
(Continued)

(52) U.S. Cl.
CPC ............ *G06Q 20/26* (2013.01); *G06Q 20/10* (2013.01); *G06Q 20/40* (2013.01)

(58) Field of Classification Search
CPC ...... G06Q 20/10; G06Q 20/102; G06Q 40/00; G06Q 40/02; G06Q 20/02; G06Q 20/108;
(Continued)

(56) References Cited

U.S. PATENT DOCUMENTS 7,680,733 B1 * 3/2010 Lundberg ............... G06Q 20/04
705/30
9,342,831 B1    5/2016 Davis
(Continued)

FOREIGN PATENT DOCUMENTS

JP      2001-243314 A    9/2001
JP      2002-007933 A    1/2002
(Continued)

OTHER PUBLICATIONS

International Search Report as received in PCT/US2014/070960 dated Sep 14, 2015.
(Continued)

*Primary Examiner* — Thien M Le
(74) *Attorney, Agent, or Firm* — Keller Jolley Preece

(57) ABSTRACT

The present disclosure relates to systems, methods, and devices for sending and receiving payments using an integrated payment and messaging system. In particular, the integrated payment and messaging system allows users to send and receive electronic payments as well as exchange messages. For example, one or more implementations involve facilitating same day push-to-debit payment transactions between a user and a co-user. To illustrate, one or more implementations involve sending a push-to-debit request to credit funds for the payment amount of the payment transaction to a debit card of a co-user, the push-to-debit request being formatted for same day processing.

20 Claims, 16 Drawing Sheets

(51) Int. Cl.
*G06Q 20/10* (2012.01)
*G06Q 20/40* (2012.01)

(58) Field of Classification Search
CPC .... G06Q 20/227; G06Q 20/38; G06Q 40/025;
G06Q 10/02; G06Q 20/027; G06Q 20/04;
G06Q 20/12; G06Q 20/14; G06Q 20/20;
G06Q 20/202; G06Q 20/26; G06Q 20/40;
G06Q 30/02; G06Q 30/04; G06Q
30/0641; G06Q 40/10; G06Q 40/12;
G06Q 40/123; G06Q 50/01; G06Q
20/105; G06Q 20/1085; G07F 19/20;
G07F 19/206
USPC .......................................... 235/379, 380, 382
See application file for complete search history.

(56) References Cited

U.S. PATENT DOCUMENTS

| | | | |
|---|---|---|---|
| 2004/0039668 A1* | 2/2004 | Lundberg | G06Q 20/04 705/35 |
| 2004/0107153 A1* | 6/2004 | Lundberg | G06Q 20/04 705/35 |
| 2004/0225517 A1* | 11/2004 | Lundberg | G06Q 20/04 705/40 |
| 2006/0206425 A1 | 9/2006 | Sharma | |
| 2008/0147536 A1 | 6/2008 | Breen | |
| 2009/0164363 A1 | 6/2009 | Ahlers et al. | |
| 2010/0030687 A1* | 2/2010 | Panthaki | G06Q 20/108 705/43 |
| 2010/0036760 A1 | 2/2010 | Abeles et al. | |
| 2011/0137689 A1 | 6/2011 | Chua et al. | |
| 2013/0144780 A1 | 6/2013 | Edmonds et al. | |
| 2014/0052633 A1 | 2/2014 | Gandhi | |
| 2014/0058939 A1 | 2/2014 | Savla | |
| 2014/0108233 A1 | 4/2014 | Yilgören et al. | |
| 2014/0172716 A1 | 6/2014 | Viidu et al. | |

FOREIGN PATENT DOCUMENTS

| | | |
|---|---|---|
| JP | 2007-527064 A | 9/2007 |
| KR | 10-2006-0039380 | 5/2006 |
| KR | 10-2009-0016164 | 2/2009 |
| KR | 10-2010-0012264 | 2/2010 |
| KR | 10-2011-0128430 | 11/2011 |
| WO | WO 2016/099492 | 6/2016 |

OTHER PUBLICATIONS

U.S. Appl. No. 14/572,275, Aug. 6, 2015, Office Action.
U.S. Appl. No. 14/572,275, Jan. 15, 2016, Notice of Allowance.
Masayuki Yamamoto, What you can do with Mobile Wallet, CardWave, Jun. 1, 2014, published by iResearch Japan Co., Ltd., vol. 27, No. 3, pp. 6-9.

* cited by examiner

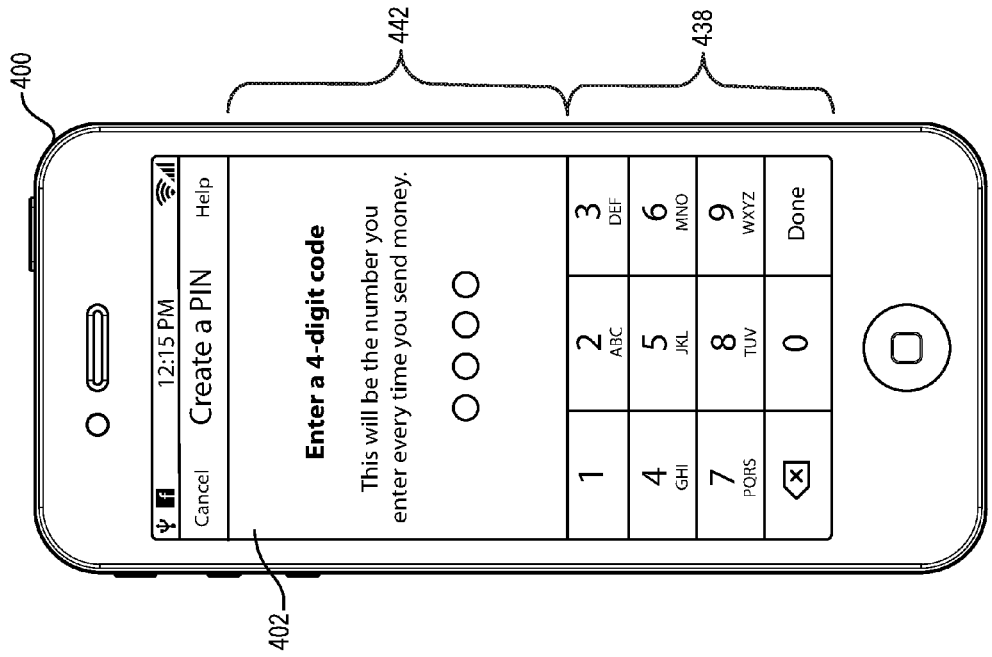
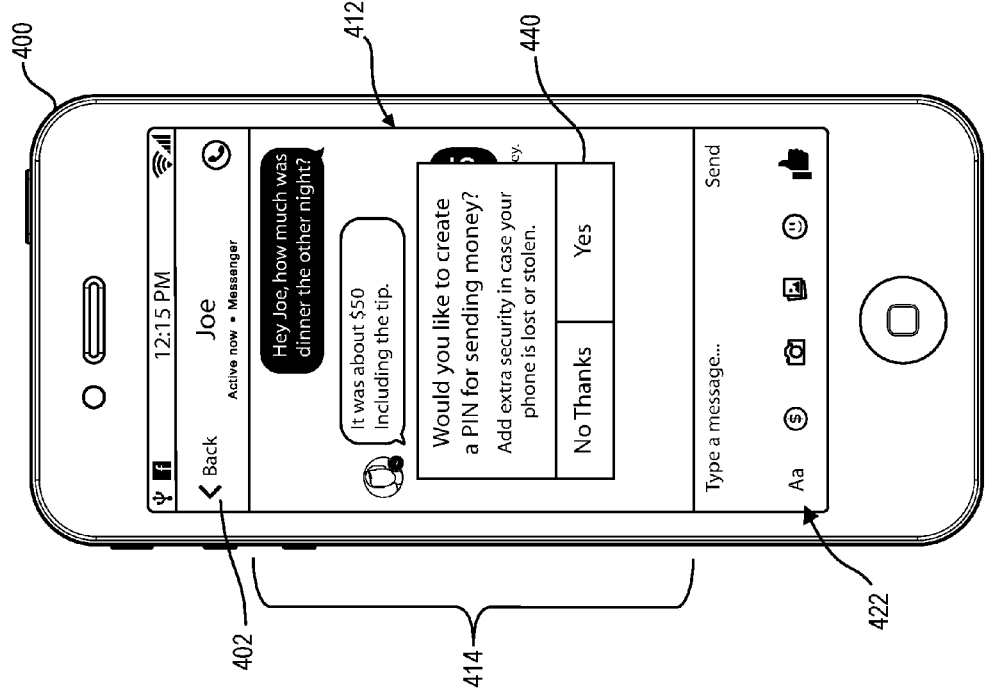
Fig. 4F
Fig. 4E

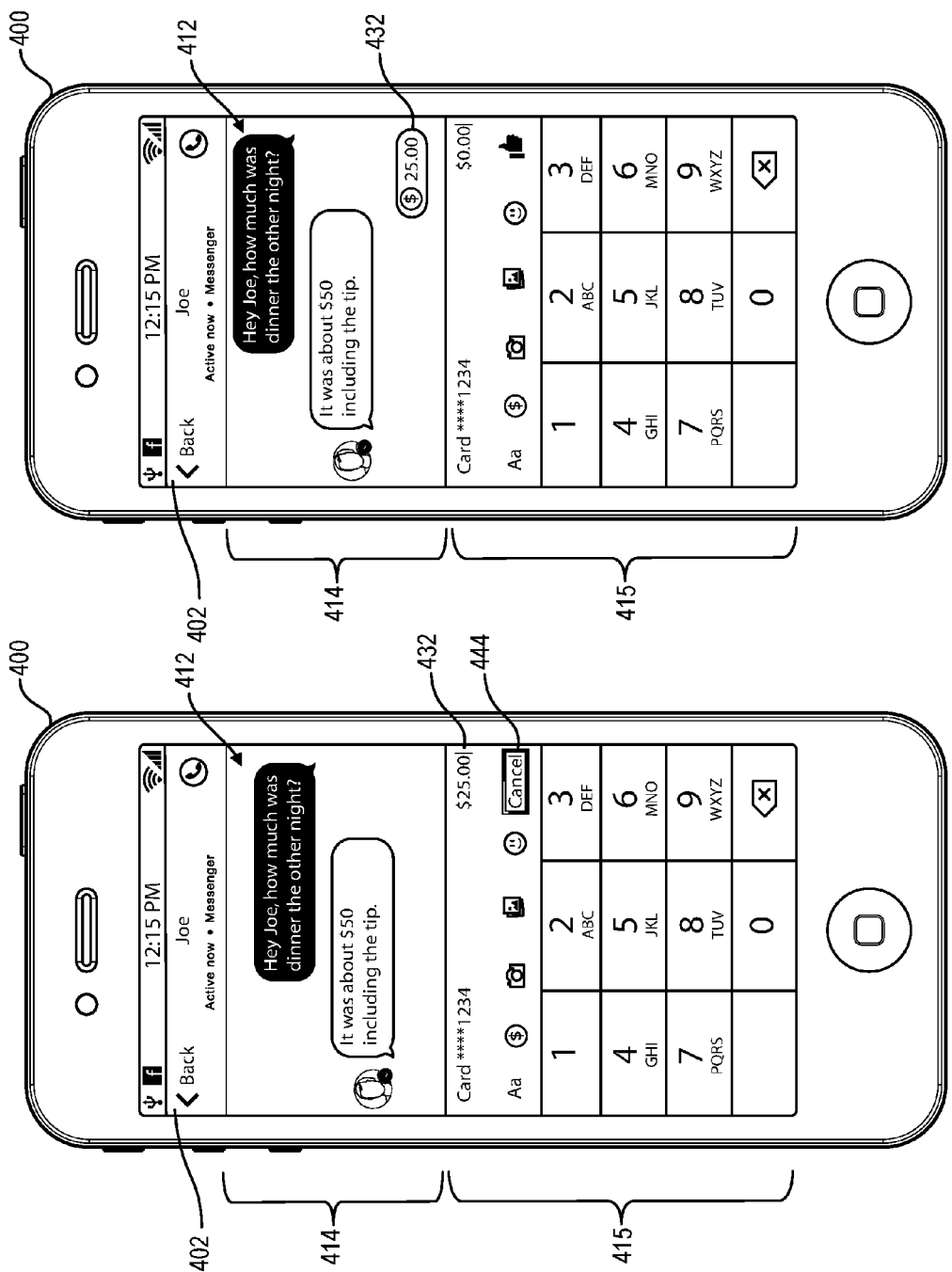

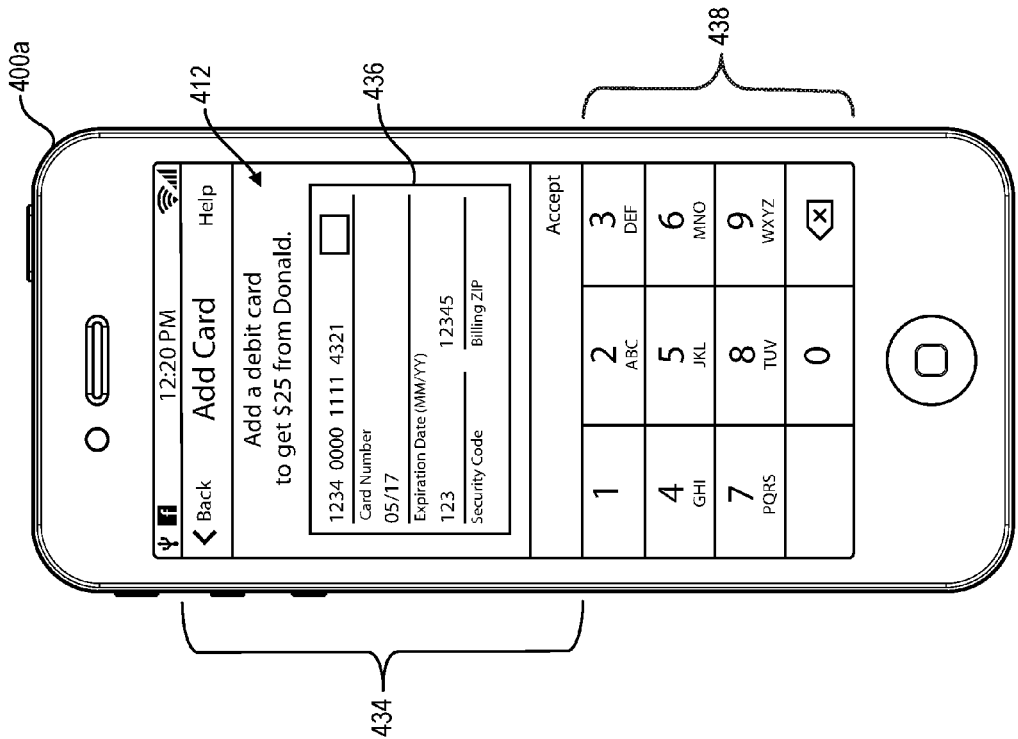
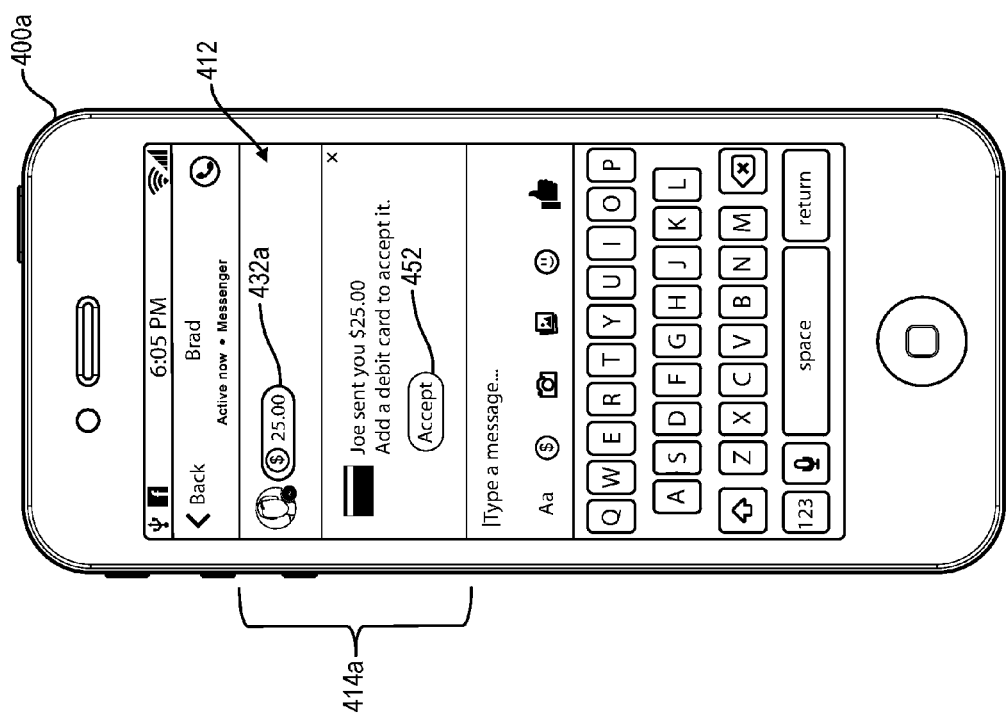
Fig. 4J
Fig. 4I

FACILITATING SAME DAY PAYMENT TRANSACTIONS

CROSS REFERENCE TO RELATED APPLICATIONS

The present application is a continuation of U.S. application Ser. No. 14/572,275, filed Dec. 16, 2014. The aforementioned application is hereby incorporated by reference in its entirety.

BACKGROUND

1. Technical Field

One or more embodiments described herein relate generally to systems and methods for electronic debit payment transactions. More specifically, one or more embodiments relate to systems and methods of improving the speed and convenience of electronic debit payment transactions.

2. Background and Relevant Art

Electronic payment systems typically allow users to perform debit payment transactions with others via software applications on one or more types of devices (e.g., desktop devices and mobile devices). Some electronic payment systems allow users to perform debit payment transactions with financial institutions or merchants. Other electronic payment systems allow users to perform debit payment transactions with other users of the electronic payment systems (i.e., peer-to-peer payment transactions).

Conventional electronic payment systems attempt to provide a convenient method for transferring money between users. Conventional electronic payment systems, however, have drawbacks that often result in an unsatisfactory payment process for users. Specifically, debit transactions using conventional electronic payment systems frequently take time for the transactions to be processed. For example, a debit transaction using conventional electronic payment systems typically takes up to several days before money sent from a source account when initiating the transaction arrives in a target account. The time delay may cause a recipient to worry that the transaction did not process correctly or that the sender did not send the funds to the correct recipient.

The limited nature of conventional electronic payment systems also adds inconvenience. In particular, the stand-alone nature of conventional electronic payment systems typically requires that users open a separate application dedicated solely to payment transactions in order to send or receive a payment. The inconvenience of the standalone nature of conventional electronic payment systems can discourage users from using such systems.

Accordingly, there are a number of disadvantages with conventional electronic payment systems and methods.

SUMMARY

One or more embodiments described herein provide benefits and/or solve one or more of the foregoing or other problems in the art with systems and methods that increase the speed and convenience of electronic payment transactions. In particular, one or more embodiments provide a payment system integrated with a messaging system that allows fast processing of payment transactions between users. In particular, one or more embodiments provide for push-to-debit transactions that are complete in a matter of minutes or less. Thus, one or more embodiments allow users to send and receive both messages and payments in a substantially instantaneous manner.

Additionally, the systems and methods can allow a user to send another user an electronic payment via a messaging interface that allows for the exchange of electronic messages between the users. The integration of an electronic payment system and a messaging system can provide users with the ability to send and receive electronic payments within the flow of a conversation. Thus, one or more embodiments allow users to communicate about a payment transaction and conduct the transaction without having to open a separate application dedicated to electronic payments.

The systems and methods can allow a user to send and receive payments for payment transactions with a co-user in a fast and seamless payment transaction. For example, one or more embodiments involve generating, at a sender client device, a payment message. The payment message can include a payment amount associated with a payment transaction. The sender client device can send the payment message to a receiver client device and send a charge request against a payment credential of the sender for the payment amount. This can allow both the payment and the message to arrive in a matter of minutes or less rather than days.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These and other features will become more fully apparent from the following description and appended claims, or can be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. In the following drawings, bracketed text and blocks with dashed borders (e.g., large dashes, small dashes, dot-dash, dots) are used herein to illustrate optional features or operations that add additional features to embodiments of the disclosure. Such notation, however, should not be taken to mean that these are the only options or optional operations, and/or that blocks with solid borders are not optional in certain embodiments of the disclosure. Understanding that these drawings depict only typical embodiments of the disclosure and are not therefore to be considered to be limiting of its scope, the disclosure will be described and explained with additional specificity and detail through the use of the accompanying drawings in which:

FIGS. 4A-4L illustrate user interfaces for completing a payment transaction as described in reference to FIGS. 3A-3C in accordance with one or more embodiments;

DETAILED DESCRIPTION

Figure 1:
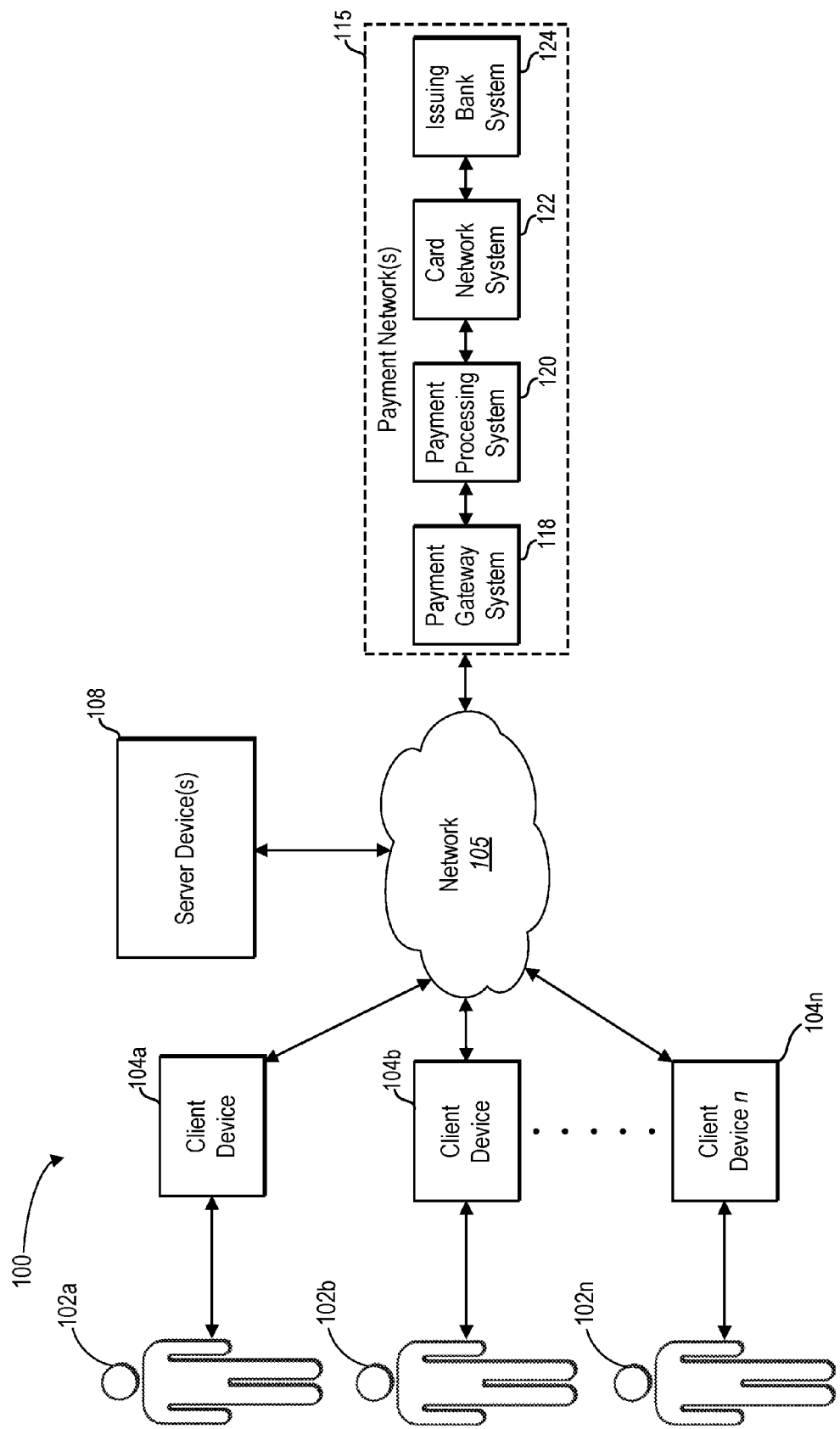
FIG. 1 illustrates a schematic diagram of an example system that facilitates the sending of messages and payments in accordance with one or more embodiments.

Embodiments of the present disclosure provide an integrated message and payment system that increases the ease and efficiency of sending and receiving payments. In particular, one or more embodiments provide an integrated message and payment system that integrates an electronic payment system and an electronic messaging system. The integrated message and payment system can allow two or more users to send and receive messages as well as electronic payments. For example, the integrated message and payment system can allow a user to send a co-user(s) an electronic payment via a messaging interface that also allows for the exchange of electronic messages with the co-user(s).

By integrating an electronic payment system and a messaging system, the system can provide users with the ability to send and receive electronic payments within the flow of a conversation. Thus, the system can allow users to communicate about a payment transaction and conduct the transaction without having to open a separate application dedicated to electronic payments. The increased ease and efficiency of sending payments seamlessly during the exchange of messages provided by one or more embodiments of the system can lead to greater use of, and satisfaction with, electronic payments.

The integrated message and payment system can provide speed in the processing of payment transactions. Specifically, the integrated message and payment system can allow a user to send a payment message for paying a co-user in a fast push-to-debit transaction. For example, the system can format payment messages for same day processing as a push-to-debit payment transaction. By formatting the payment messages for same day processing as a push-to-debit payment transaction, the system can facilitate the delivery of the payment message and the funds as a same day transaction. In one or more embodiments, the payment system can format payment messages for substantially instant push-to-debit transactions (e.g., within minutes or less 34). Thus, the system can enable a co-user to have access to funds transferred in a push-to-debit transaction soon after receiving a payment message indicating the payment transaction.

In one or more additional embodiments, the system can select whether to format payment messages for same day processing based on payment credentials associated with a sender and/or a recipient. In particular, the system can determine whether a payment credential of a sender or a recipient is compatible with fast push-to-debit transactions. For example, the system can determine that a recipient has a payment credential that is compatible with same day processing, and format a payment message from the sender to process a payment transaction with the co-user accordingly. Alternatively, if a recipient does not have a payment credential that is compatible with same day processing, the system can prompt the co-user to enter a payment credential that is compatible with same day processing.

In one or more additional embodiments, the system can transfer funds to a recipient using an intermediate account to speed up the payment transaction. Specifically, the system can maintain an intermediate account with reserve funds for transferring funds to a recipient. For example, the system can determine a payment amount to transfer to a recipient based on a payment message from a sender. The system can then transfer the payment amount from the intermediate account prior to receiving funds from a payment credential of the user. Thus, by using an intermediate account of reserve funds, the system can speed up payment transactions that may otherwise be slower due to capabilities of a payment credential of a sender.

In one or more embodiments, the system can process payment transactions and communications between a user and a co-user in parallel. For example, the system can include a network application for managing communications between users and storing the communications and a separate payment engine for processing payment transactions between users. In particular, the system can send a payment message from a user to a co-user via the network application and simultaneously process a corresponding payment transaction using the payment engine. By processing a payment message in parallel with a corresponding payment transaction, the system can provide a payment message from a sender to a recipient more quickly.

As used herein, the term "message" or "messages" refers to any form of electronic communication between two or more computing devices. Messages can include text messages, photos, stickers or other icons, videos, voice recordings, music, voice mails, etc. In one or more embodiments, a message is an instant message communicated in real-time or near real-time. In alternative embodiments, however, a message can refer to any from of electronic communication, such as an SMS message, an email, or a social network post or comment.

In addition, the term "payment message" refers to a message that indicates payment information that allows the system to initiate a payment transaction. For example, a payment message can include a data package that includes a payment amount, a sender, a recipient, a payment method, formatting indicating how the system processes the payment method, as well as additional information such as user provided text for a message.

As used herein, the term "payment transaction" refers to any type of electronic transaction exchanging currency or credits between two or more entities. For example, a payment transaction can be a financial electronic transaction between two users of the integrated message and payment system. In another example, a payment transaction can be a financial electronic transaction between a user and a financial institution or other multi-person entity. Additionally, a payment transaction can represent a monetary gift, a payment of a debt, a funding of a loan, a payment in consideration for a purchase of goods and/or services, or any other type of monetary transfer. In addition, a payment transaction can be made in one or more currencies and converted, based on an exchange rate for example, to one or more additional currencies.

As used herein, the term "account" or "payment credential" can refer to a user's debit card account, bank account, credit card account, messaging account, gift card, or any other account from which money can be deducted or to which money can be deposited. Also as used herein, the term "push-to-debit" can refer to methods of crediting funds to a user's debit card account. The meanings of the above terms, as well as additional terms, will become more apparent in light of the disclosure below with respect to the figures.

FIG. 1 is a schematic diagram illustrating an integrated messaging and payment system 100 in accordance with one or more embodiments. An overview of the system 100 is described in relation to FIG. 1. Thereafter, a more detailed description of the components and processes of the system 100 are provided in relation to the remaining figures.

As illustrated by FIG. 1, the system 100 can allow user 102a, user 102b, and up to any number of users 102n (collectively "users") to interact using a corresponding number of client devices 104a, 104b, 104n. As further illustrated in FIG. 1, the client devices can communicate with server device(s) 108 via a network 105. In addition, the system 100 can include a payment network 115 communicatively coupled with the server device(s) 108 via the network 105. Although FIG. 1 illustrates a particular arrangement of the users, the client devices, the network 105, the server device(s) 108, and the payment network 115, various additional arrangements are possible. For example, the client devices 104a, 104b, 104n may directly communicate with the server device(s) 108, bypassing network 105.

As briefly mentioned above, FIG. 1 shows that user 102a and user 102b can use client devices 104a and 104b, respectively, to communicate with one another via the server device(s) 108. For example, user 102a and user 102b can exchange electronic messages containing text, digital content (e.g., audio, images, video), location information, and other forms of data and information. For instance, the user 102a, using client device 104a, can compose a message intended for the user 102b. After composing the message, the user 102a can cause the client device 104a to send the message intended for the user 102b via the network 105 to the server device(s) 108. The server device(s) 108 can identify the user 102b as the intended recipient, and forward the message to the client device 104b associated with the user 102b.

In addition allowing the users to exchange electronic communications, the system 100 can allow the users to send and receive monetary payments to and from one another. In one or more embodiments, the system 100 allows users to define and send a payment message to another user. For instance, the system 100 can allow the user 102a to send a payment to user 102b via the server device(s) 108 and the payment network 115. Likewise, user 102b can receive notice of the payment, and accept or decline the payment. As will be explained in more detail below, the server device(s) 108 can communicate with the payment network 115 to coordinate a transaction that facilitates the payment between the users (i.e., their accounts).

While the system 100 can facilitate a payment between users 102a and 102b, the system 100 can also facilitate a payment between more than two users, such as a group of users. For example, the user 102a may send a payment to users 102b, 102n. In one or more embodiments, the user 102a can send payments to multiple users within the same payment transaction, as will be discussed in further detail below. Furthermore, in one or more embodiments, a group of users may be provided with the ability to send and/or receive payments through the system 100, either to or from other groups or individual users.

While FIG. 1 illustrates the users as people, the users may include other entities, such as business, government, or other entities. For example, the user 102a can use the system 100 to provide a payment to a business for services or products. For instance, the user 102a can communicate with a business via the system 100, and ultimately decide to make a purchase of a product or service from the business. Using the same system 100, the user 102b can then send a payment for the product or service to the business. Similarly, a business may send a payment to other businesses or vendors, whether an individual or a business entity.

Figure 7:
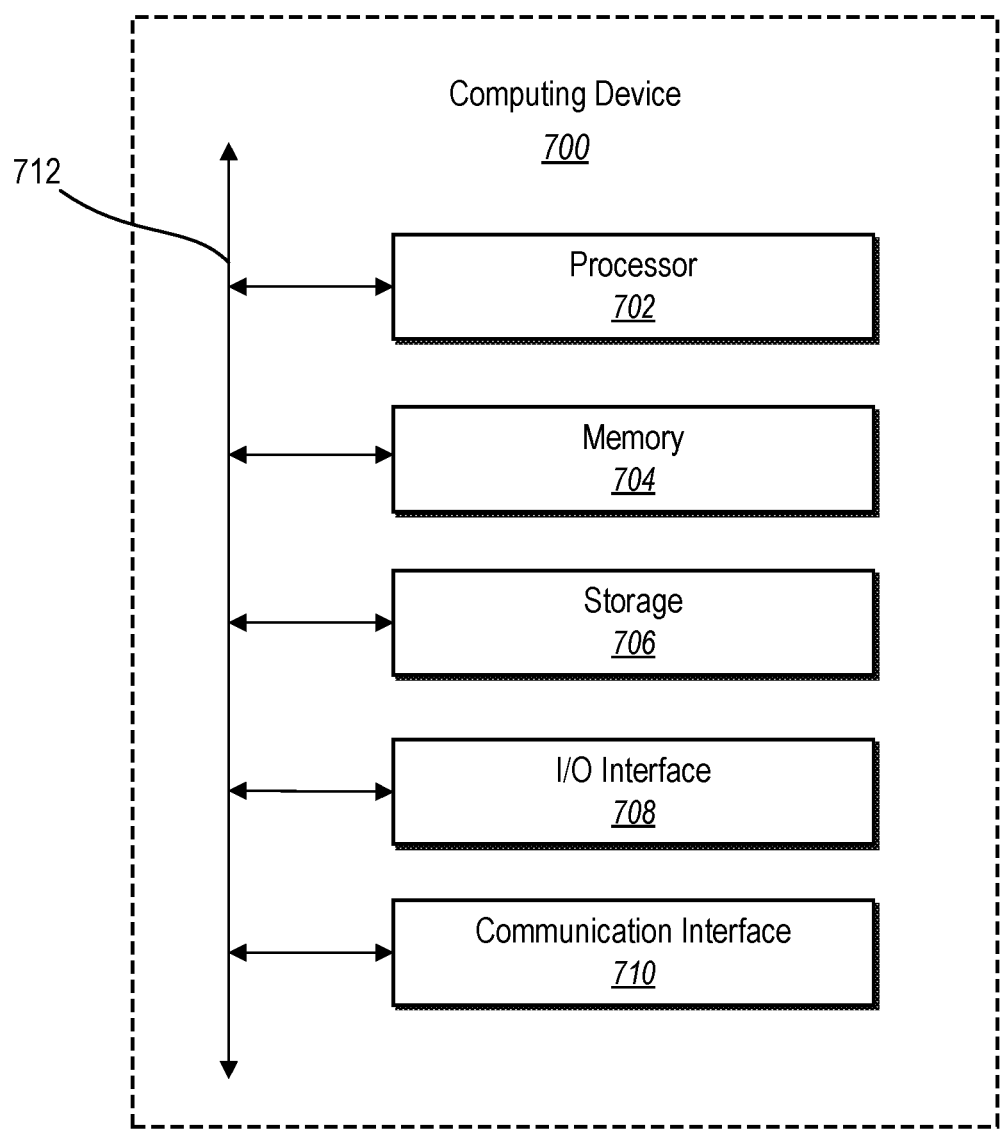
FIG. 7 illustrates a block diagram of an example computing device in accordance with one or more embodiments.

As mentioned above, and as FIG. 1 illustrates, the users 102a and 102b can interact with the client devices 104a and 104b, respectively. Examples of client devices include computing devices such as mobile devices (e.g., smartphones, tablets), laptops, desktops, or any other type of computing device. FIG. 7 and the corresponding description provide additional information regarding computing devices. Moreover, and as mentioned above, the client devices can communicate with the through the network 105. In one or more embodiments, the network 105 includes the Internet or World Wide Web. The network, however, can include one or more private and/or public networks that use various communication technologies and protocols, as further described below with reference to FIG. 7.

As briefly discussed above, the system 100 can coordinate the sending and receiving of payments between the users. For example, the user 102a can compose and send a payment message to the user 102b. For instance, the user 102a can provide input via the client device 104a to define the payment method (e.g., the sender user's 102a credit card, debit card, account balance), payment amount, payment currency, payment description, and/or various other payment details.

From the user's 102a perspective, for example, the sender user 102a can compose and send a payment message in a similar manner as sending a communication message (e.g., text). For example, in one or more embodiments, the user 102a can compose a payment message that indicates an amount of payment the user 102a desires to send to user 102b. After composing the payment message, the sender user 102a can then send the payment message to the user 102b via the server device(s).

In one or more embodiments, the system 100 can coordinate a transaction between one or more accounts of the sender user 102a and one or more accounts of the recipient user 102b via the payment network 115. For example, in response to receiving a payment message from the sender user 102a, the server device(s) can communicate transaction information to process a payment using one or more components within the payment network 115. Alternatively, or additionally, the system 100 can maintain one or more user accounts directly, and therefore, the system 100 can coordinate a transaction, or a portion of a transaction.

As illustrated in FIG. 1, the payment network 115 can include a payment gateway system 118, a payment processing system 120, a card network system 122 and an issuing bank system 124. In alternative embodiments, however, the payment network 115 can include more or fewer components depending on a particular embodiment of system 100.

In one or more embodiments, for example, the system 100 can communicate with the payment network 115 to authorize and process a transaction. For example, the system 100 can send a transaction to the payment gateway system 118, as shown in FIG. 1. Once the payment gateway system 118 receives the transaction, the payment gateway system 118 can send the transaction to the processor (e.g., payment processing system 120) used by a payment recipient user's acquiring bank. Based on the method of the payment (e.g., sender user's account), the payment processing system 120 can transmit the transaction to an appropriate card network system 122. In many instances, the card network system 122 then sends the transaction to an issuing bank system 124.

The issuing bank system 124 either approves or declines the transaction, and sends the decision back to the card network system 122. The card network 122 then sends the decision to the payment processing system 120. The payment processing system 120 can then forward the decision to the payment gateway system 118, and in one or more embodiments, the payment gateway system 118 can maintain the details related to the transaction and the decision. The payment processing system 120 also sends the decision to the system 100.

The acquiring bank can then send a funding request in satisfaction of the deposit amount to the payment processing system 120, which passes the funding request to the appropriate card network system 122. The card network system 122 then sends the funding request to the issuing bank system 124. The issuing bank system 124 can post the transaction to the sender user's account and pass a release of the funds to the card network system 122, which are then passed to the payment processing system 120, and then the acquiring bank.

According to one or more embodiments, after authorizing and/or receiving a payment in a payment transaction between the user 102a and the user 102b, the system 100 can transfer funds in a same day or substantially instant payment transaction. Specifically, the system 100 can facilitate a push-to-debit transaction that deposits the funds for a payment transaction into a debit account of the user 102b. For example, the system 100 can facilitate a same day or substantially instant payment from the sender user 102a to the recipient user 102b by depositing designated funds into the recipient user's debit account according to capabilities of the sender user's account and/or the recipient user's account and according to formatting of a payment message associated with the user 102a. Additional details relating to the specific systems, methods, components and process of system 100 are described below.

Figure 2:
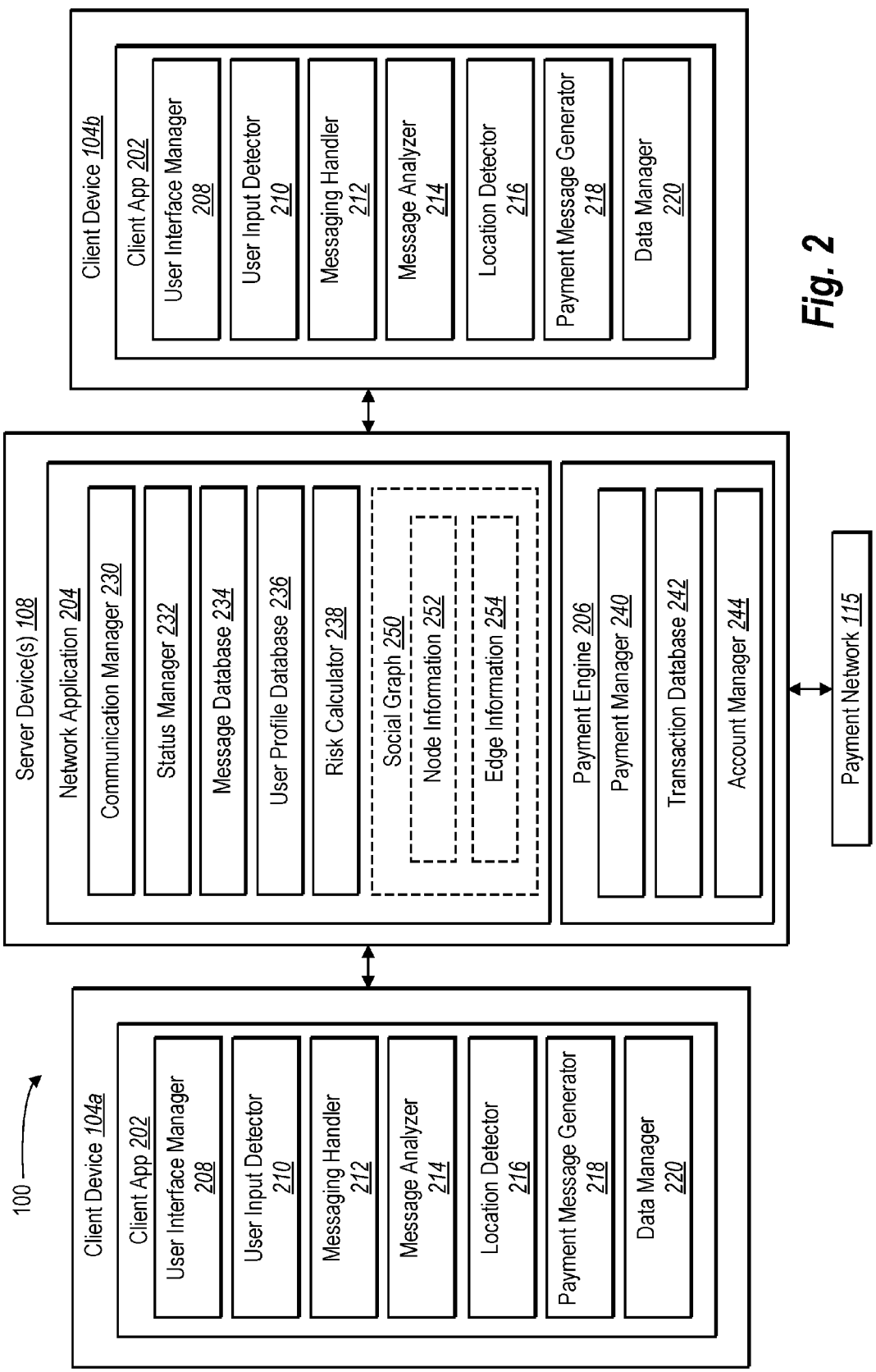
FIG. 2 illustrates a detailed schematic diagram of the system of FIG. 1 in accordance with one or more embodiments.

FIG. 2 illustrates a schematic diagram illustrating additional details of the system 100. As shown, the system 100 can include client devices 104a, 104b, server device(s) 108, and payment network 115. In general, the system 100 can allow a user of the client device 104a to send a payment to or receive a payment from a recipient of client device 104b. Additionally, the system can allow the user of the client device 104a to exchange messages with a user of the client device 104b.

As shown, the system 100 can include various components on the client devices 104a, 104b and the server device(s) 108. For example, FIG. 2 illustrates that the client devices 104a, 104b can each include a client application 202 (e.g., a messaging application) with various components and the server device(s) 108 can include a network application 204 and a payment engine 206 with various components. The components of the client applications 202, the network application 204, and the payment engine 206 can work together to allow the users to send payments, receive payments, and exchange messages as described in greater detail below.

As shown, the client application 202 can include a user interface manager 208, a user input detector 210, a messaging handler 212, a message analyzer 214, a location detector 216, a payment message generator 218, and a data manager 220. FIG. 2 illustrates that the network application 204 can include a communication manager 230, a status manager 232, a message database 234, a profile database 236, and a risk calculator 238. As described below, the network application 204 can also optionally include a social graph 250, which includes node information 252 and edge information 254. FIG. 2 also illustrates that the payment engine 206 can include a payment manager 240, a transaction database 242, and an account manager 244. Each of the components 208-220, 230-244, 252, and 254 can communicate with each other using any suitable communication technologies. It will be recognized that although components 208-220, 230-244, 252, and 254 are shown to be separate in FIG. 2, any of components 208-220, 230-244, 252, and 254 may be combined into fewer components, such as into a single facility or module, or divided into more components as may serve a particular embodiment. While FIG. 2 describes certain components as part of the client applications 202 and other components as part of the network application 204, the present disclosure is not so limited. In alternative embodiments, one or more of the components shown as part of the client application 202 can be part of the network application 204 or vice versa. Similarly, one or more components shown as part of the network application 204 can be part of the payment engine 206 or vice versa.

The components 208-220, 230-244, 252, and 254 can comprise software, hardware, or both. For example, the components 208-220, 230-244, 252, and 254 can comprise computer instructions stored on a non-transitory computer-readable storage medium and executable by at least one processor of the client devices 104a, 104b or the server device(s) 108. When executed by the at least one processor, the computer-executable instructions can cause the client device(s) 104a, 104b or the server device(s) 108 to perform the methods and processes described herein. Alternatively, the components 208-220, 230-244, 252, and 254 can comprise hardware, such as a special purpose processing device to perform a certain function or group of functions. Additionally or alternatively, the components 208-220, 230-244, 252, and 254 can comprise a combination of computer-executable instructions and hardware.

In one or more embodiments, the client application 202 can be a native application installed on the client device 104a, 104b. For example, client application 202 may be a mobile application that installs and runs on a mobile device, such as a smart phone or a tablet. Alternatively, the client application 202 can be a desktop application, widget, or other form of a native computer program. Alternatively, the client application 202 may be a remote application that the client device 104a, 104b accesses. For example, the client application 202 may be a web application that is executed within a web browser of the client device 104a, 104b.

As mentioned above, and as shown in FIG. 2, the client application 202 can include a user interface manager 208. The user interface manager 208 can provide, manage, and/or control a graphical user interface (or simply "user interface") that allows a user to compose, view, and send messages as well as send payments. For example, the user interface manager 208 can provide a user interface that facilitates the composition of a message, such as an instant message. Likewise, the user interface manager 208 can provide a user interface that displays messages received from other users.

More specifically, the user interface manager 208 may facilitate the display of a user interface (e.g., by way of a display device associated with the client device 104a, 104b). For example, the user interface may be composed of a plurality of graphical components, objects, and/or elements that allow a user to compose, send and receive messages or payments. More particularly, the user interface manager 208 may direct the client device 104a, 104b to display a group of graphical components, objects and/or elements that enable a user to view a messaging thread.

In addition, the user interface manager 208 may direct the client device 104a, 104b to display a one or more graphical objects or elements that facilitate user input for composing and sending a message. To illustrate, the user interface manager 208 may provide a user interface that allows a user to provide user input to the client application 202. For example the user interface manager 208 can provide one or more user interfaces that allow a user to input one or more types of content into a message. As used herein, "content" refers to any data or information to be included as part of a message. For example, the term "content" will be used herein to generally describe, text, images, digital media, files, location information, payment information and any other data that can be included as part of a message.

As discussed above, one example of content that can be included in a message is a payment from a sender user to a recipient user. In one or more embodiments, the user interface manager 208 can provide a user interface to allow a user to easily and efficiently define and send a payment to one or more other users. For example, the user interface manager 208 can provide one or more input fields and/or one or more user selectable elements with which a user can interact to create and send a payment.

In addition to the forgoing, the user interface manager 208 can receive instructions or communications from one or more components of the client application 202 to display updated message information, updated status of the payment, and/or updated available actions. The user interface manager 208 can update an available option based on whether a particular option is available at a particular point within the transaction process. The user interface manager 208 can add, remove, and/or update various other selectable actions within the sender and/or receiver status messages, as will be discussed below.

The user interface manager 208 can facilitate the input of text or other data to be included in an electronic communication or message. For example, the user interface manager 208 can provide a user interface that includes a keyboard. A user can interact with the keyboard using one or more touch gestures to select text to be included in an electronic communication. For example, a user can use the keyboard to enter a message to accompany and/or describe one or more other content items in an electronic communication. In addition to text, the user interface, including the keyboard interface, can facilitate the input of various other characters, symbols, icons, or other character information.

As further illustrated in FIG. 2, the client application 202 can include a user input detector 210. In one or more embodiments, the user input detector 210 can detect, receive, and/or facilitate user input in any suitable manner. In some examples, the user input detector 210 can detect one or more user interactions with respect to the user interface. As referred to herein, a "user interaction" means a single interaction, or combination of interactions, received from a user by way of one or more input devices.

For example, user input detector 210 can detect a user interaction from a keyboard, mouse, touch pad, touchscreen, and/or any other input device. In the event the client device 104a, 104b includes a touchscreen, the user input detector 210 can detect one or more touch gestures (e.g., swipe gestures, tap gestures, pinch gestures, or reverse pinch gestures) from a user that forms a user interaction. In some examples, a user can provide the touch gestures in relation to and/or directed at one or more graphical objects or graphical elements of a user interface.

The user input detector 210 may additionally, or alternatively, receive data representative of a user interaction. For example, user input detector 210 may receive one or more user configurable parameters from a user, one or more user commands from the user, and/or any other suitable user input. The user input detector 210 may receive input data from one or more components of the client application 202, from the storage on the client device 104a, 104b, or from one or more remote locations (e.g., the network application 204).

The client application 202 can perform one or more functions in response to the user input detector 210 detecting user input and/or receiving other data. Generally, a user can control, navigate within, and otherwise use the client application 202 by providing one or more user inputs that the user input detector 210 can detect. For example, in response to the user input detector 210 detecting user input, one or more components of the client application 202 allow a user to select a recipient for a message, compose a message, select content to include in a message, and/or send a message to the recipient. In addition, in response to the user input detector 210 detecting user input, one or more components of the client application 202 allow a user to navigate through one or more user interfaces to review received messages, contacts, etc.

In one or more embodiments, in response to the user input detector 210 detecting one or more user inputs, the client application 202 can allow the user to create a payment to send to one or more other users. For example, a user wanting to send a payment can interact with a payment element provided on a menu within a user interface. Upon detecting the user interaction with the payment element, the user input detector 210 can cause the user interface manager 208 to provide a user interface for creating a payment. Therefore, in response to the user input detector 210 detecting one or more user inputs, the client application 202 can allow a user to create a customized payment that defines a payment to be sent to another user, as will further be described below.

As further illustrated in FIG. 2, the client application 202 can include a message handler 210 that manages messages provided to or sent from the client application 202. For example, the message handler 210 can interact with the user interface manager 208 and the user input detector 210 to coordinate the sending and receiving of messages using the client application 202. The message handler 210 may direct the sending and receiving of messages to and from the network application 204 over the course of an electronic messaging session among a plurality of participants. The message handler 210 may organize incoming and outgoing messages and direct the user interface manager 208 to display messages.

In one or more embodiments, the message handler 210 can facilitate receiving and sending data via the client application 202. In particular, message handler 210 can facilitate sending and receiving messages. For example, the message handler 210 can package content to be included in a message and format the message in any necessary form that is able to be sent through one or more communication channels and using an appropriate communication protocol, as described herein. Likewise, the message handler 210 can process messages the client device 204 receives from other users.

In addition to providing communication functions for the client application 202, the message handler 210 can provide access to message data. For example, the message handler 210 can access data that represents a list of contacts, or one or more groups of contacts, to include and recipients to a message. To illustrate, the message handler 210 can obtain and provide data representing a contact list to the user interface manager 208 to allow the user to search and browse a contact list, and ultimately select an individual contact or group of contacts to include as recipients of a message. In one or more embodiments, a social-networking system can maintain remote contact list data (e.g., a "friends list"), and the message handler 210 can access the contact list data on the social-networking system for use within the client application 202.

The message handler 210 can also provide access to other local or remote data that the client application 202 can use to compose, send and receive messages. For instance, the message handler 210 can obtain access to files, images, audio, video and other content that a user can include in a message. Moreover, the message handler 210 can provide access to one or more functions of the sender client device 204 to provide the user the ability to capture or create content to include within a message. For example, the message handler 210 can activate a camera, a microphone, or other function that allows the user to capture content to include in a message.

In addition, the message handler 210 can facilitate the sending of a payment. In particular, FIG. 2 illustrates that the client application 202 can include a payment message generator 218 that can generate a payment message that the message handler 210 can send to the network application 204 to initiate a payment process/transaction. For example, upon a sender selecting a payment element on a user interface, the payment message generator 218 can create a data package that includes payment information received from the sender. A payment message can include an indication of an amount of money to be sent as part of the payment transaction as well as any necessary information to allow the network application to perform a payment transaction.

In one or more embodiments, the payment message generator 218 can create a data package that includes the payment amount, one or more sender identifiers, one or more recipient identifiers, one or more payment methods or sender account information, authorization information, currency information, a message or payment description, and/or any other data that may be helpful to facilitating a payment form the sender to the recipient. Alternatively, a payment message can simply identify a recipient and an amount of a payment. The payment message generator 218 can pass the payment message (e.g., the data package that includes the payment information) to the message handler 210 to send to the network application 204.

The payment message generator 218 can also obtain payment information from various sources. For example, the payment message generator 218 can obtain payment information directly from the sender via the user input detector 210. Additionally, or alternatively, the payment message generator can gain access to payment information maintained on the client device 104a, 104b by the data manager 220. For example, the client application 202 can allow a sender to input and save various payment methods and/or identify a default payment method, default currency, and otherwise specify other user preferences related to sending and/or receiving a payment.

The payment message generator 218 may also facilitate formatting of messages based on input from the user via the client application 202. Specifically, the payment message generator 218 can facilitate formatting payment messages for same day processing of push-to-debit transactions. For example, the payment message generator 218 can determine that a user has input a request to pay a co-user in a push-to-debit transaction and format of the payment message to the co-user accordingly. In one or more examples, the payment message generator 218 can determine that the payment message should be formatted for same day processing based on payment information or payment credentials associated with the payment transaction or based on a specific selection by the sending user.

In one or more embodiments, the payment message generator 218 can access and provide a token within a payment message. The token can reference a payment credential stored by the network application 204. For example, the payment message generator 218 can retrieve a token to include in, or with, the payment message that verifies the sender and/or sender client device 104a as authorized to make the payment using a payment credential stored by the network application 204.

As mentioned above, the client application 202 can further include a message analyzer 214. The message analyzer 214 can analyze messages sent from and received by the client application 202 for potential events. In one or more embodiments, the message analyzer 214 can infer the events from the electronic messages exchanged between users based on contextual content in the exchanged messages. Specifically, the message analyzer 214 can identify certain phrases or character strings that indicate a social networking event or an opportunity for a payment. For example, the character strings can include predetermined character strings from electronic messages in a messaging thread between two or more users.

The client application 202 can further include a location detector 216. The location detector 216 can access or identify a location of the client device 104a, 104b based on GPS information from the client device 104a, 104b, cell tower triangulation, WIFI received signal strength indication, WIFI wireless fingerprinting, radio-frequency identification, near-field communication, by analyzing messages, or based on data from other sources. The location detector 216 can then provide the location of the client device 104a, 104b to the message analyzer 214 or the network application 204. Additionally, the location detector 216 can receive indications of the location of other client devices from the network application 204 and provide them to the message analyzer 214.

As discussed above, the client device 104a can include a data manager 220, as illustrated in FIG. 2. The data manager 220 can maintain message data representative of data used in connection with composing, sending, and receiving messages between a user and one or more other users. For example, message data can include message logs, contact lists, content, past communications, and other similar types of data that the client application 202 can use in connection with providing the ability for users to communicate using the client application 202.

The data manager 220 may also maintain payment data representative of information used to generate payment messages. For example, payment data may include a payment method data (i.e., a credential) and/or account data (e.g., bank or credit card account data). Furthermore, payment data can include payment preferences (e.g., a default payment method). In general, payment data can include any data that the payment message generator 218 can use in connection with generating a payment.

As briefly mentioned above, in addition to the client devices 104a, 104b, the system 100 can further include a network application 204 that is implemented in whole or in part on the server device(s) 108. In one or more embodiments of the present disclosure, the network application 204 comprises a social-networking system (such as but not limited to FACEBOOK™), but in other embodiments the network application 204 may comprise another type of application, including but not limited to an e-mail application, search engine application, banking application, or any number of other application types that utilizes user accounts.

In one or more embodiments where the network application 204 comprises a social-networking system, the network application 204 may include a social graph 250 for representing and analyzing a plurality of users and concepts. Node storage 252 of the social graph 250 can store node information comprising nodes for users, nodes for concepts, nodes for transactions, and nodes for items. Edge storage 254 of the social graph 250 can store edge information comprising relationships between nodes and/or actions occurring within the social-networking system. Further detail regarding social-networking systems, social graphs, edges, and nodes is presented below with respect to FIG. 8.

The communication manager 230 can process messages received from client applications 202. For example, the communication manager 230 can interact with a message handler 206 of a client application 202. The communication manager 230 can act as a director for messages sent back and forth among users in an electronic messaging thread. The communication manager 230 may receive a message from client application 202, detect the intended recipient of the message, and send the message to the client application 202 (or device) associated with the intended recipient. One will appreciate that the communication manager 230 can direct a message for a recipient to multiple client devices associated with the recipient (i.e., each device upon which the user has installed a version of the client application 202).

Additionally, the communication manager 230 can also re-format or otherwise modify the content or format of a message based on the messaging protocol used by a destination communication device or a type. As such, in one or more embodiments the system 100 can allow participants using different communication platforms to exchange messages. For example, the communication manager 230 can receive a message in a first protocol (SMS, IM, XMPP, APNS, etc.), re-format the message into a second protocol, and send the reformatted message to the intended recipient(s).

The status manager 232 can track the status of users of the client applications 202 and/or the client devices 104a, 104b. For example the status manager 232 can identify when a user is logged into the client application 202, when a user is active on the client application 202, when a client device 104a, 104b associated with a user or user account is online or active. The status manager 232 can send indications (such as push notifications) to the client application 202 to notify the client application 202 of the status of users, device, messages, or payments. The user interface manager 208 can add, modify, or otherwise change or update status notifications based on indications received from the status manager 232. For example, the status manager 232 can send an indication to the client application 202 indicating that another user has accessed a message, received a payment, sent a payment, is active, a device or device type a co-user is active on (e.g., mobile vs. web), etc. The user interface manager 208 in turn an update a user interface to notify a user of the status.

The network application 204 may also include a message database 234. The message database 234 can maintain message data representative of content of messages from electronic messaging sessions among a plurality of participants. The message database 234 may maintain status data representative of the information mentioned above that the status manager 232 tracks. The message database 234 can thus provide an archive of messaging threads, which the network application 204 can provide to a user on demand or once a user logs into the client application 202 using a new computing device.

As mentioned previously, the server device(s) 108 can include a payment engine 206 having a payment manager 240. The payment manager 240 of FIG. 2 can integrate the sending and receiving of payment messages and initiate payment transactions, and may employ one or more application programming interfaces (APIs). For example, upon the communication manager 230 receiving a payment message, the communication manager 230 can send any payment details to the payment manager 240. The payment manager 240 can then use the payment details retrieved from the payment message to initiate a payment transaction using the payment network 115.

According to one or more embodiments, the system 100 can maintain the payment engine 206 separate from the network application 204. For example, the system 100 can implement payment processes associated with the payment engine 206 separately from at least some of the functionality of the network application 204 (e.g., using a messaging database for recovery). To illustrate, the system 100 can implement the functionality of the payment engine 206 on a first group of one or more servers and the functionality of the network application 204 on a second group of one or more servers. Implementing functionality of the payment engine 206 and the network application on separate servers can allow the system 100 to ensure that at least some of the financial information associated with the users is maintained apart from the network application 204 to comply with Payment Card Industry (PCI) standards. Alternative configurations of servers and/or software than those described herein may also allow the system 100 to comply with PCI standards.

The payment manager 240 can coordinate a transaction corresponding to a payment defined in a payment message. As generally explained above, the payment manager 240 can coordinate a transaction via the payment network 115 that corresponds to a payment message, monitor the status of the transaction, and provide status information regarding the transaction. More specifically, the payment network 115 can authorize a transaction, fund a transaction, and/or settle an individual transaction or batch of transactions as described above with reference to FIG. 1. In one or more embodiments, the payment manager 240 can use one or more application programming interfaces (API) to communicate relevant information with the payment network 115.

In additional or alternative embodiments, the client application 202 on the client device 104a can cause the client device 104a to send a payment message and/or messages associated with the payment message to the network application 204 and the payment engine 206 in parallel. In particular, when the client application 202 receives a selection by the user to pay an amount to a co-user, the client application 202 can cause the client device 104a to send a payment message to the first network application 204 and to the payment engine 206. Thus, the network application 204 can process the payment message while the payment engine 206 is also processing the payment transaction associated with the payment message. In alternative embodiments, the client device 104a can send messages to one or more servers associated with the network application 204, which can then forward the messages to the payment engine 206, or vice versa.

To complete a transaction, the payment manager 240 can access or obtain a payment credential for the recipient (such as deposit account information, debit card, credit card, gift card, electronic wallet). The payment manager 240 can obtain a recipient's payment credential (e.g., a debit card for receiving substantially instant payments) using a variety of methods. In one example embodiment, a recipient can register one or more deposit accounts or other payment credentials with the network application 204. Upon a user registering a deposit account or other payment credential, the user profile database 236 can maintain the payment credential.

After the payment manager 240 receives the payment information, the payment manager 240 can identify the recipient. The payment manager 240 can lookup the recipient in the user profile database 236 to determine if the recipient has registered a payment credential. At this point, the payment manager 240 can initiate the transaction.

In the event that the recipient's user profile does not include a payment credential, or if the recipient's user profile does not include a payment credential that supports same day payments, the payment manager 240 can direct the communication manager 230 to send the recipient a message prompting the recipient to provide a payment credential. The message may prompt the recipient to register a payment credential by providing one or more interactive fields that allows the recipient to provide payment credential details. Additionally, or alternatively, upon determining that a recipient does not have a registered payment credential, the payment manager 240 can generate a temporary deposit 242. In particular, the payment manager 240 can generate an account number and associate the account number with the recipient's user profile. In one or more embodiments, the recipient may already have a temporary account, and therefore, the payment manager 240 can use the previously created temporary account to complete the transaction. In particular, the temporary account allows the payment manager 240 to proceed immediately to process a transaction without delaying the payment process from the perspective of either the sender or the recipient.

The account manager 244 can manage one or more temporary accounts in connection with the networking application. For example, upon completion of the payment, the payment manager 240 can deposit the payment amount to a temporary account. In one or more embodiments, the payment manager 240 can cause the communication manager 230 to send the recipient a message indicating that the payment manager 240 has transferred the money to the recipient's payment credential. For example, if the recipient has already registered a debit account, the payment manager 240 can transfer the money to the registered debit account in a substantially instant payment transaction. Alternatively, if the recipient does not want to register a deposit account, the message system can provide the recipient instructions to withdraw the money from the temporary account.

In addition to coordinating a transaction via the payment network 115, the payment manager 240 can also coordinate a transaction with respect to one or more system user accounts. In one or more embodiments, the network application 204 can support user cash accounts, such as gift card accounts, cash card accounts, or similar types of user accounts. The sender can specify the sender's user cash account as the method of payment, and likewise, the recipient can set the recipient's user cash account as the registered deposit account. Therefore, in at least some embodiments, the entire transaction, or substantially the entire transaction, can be processed within the network application 204.

In one or more embodiments, the system 100 can also allow a recipient to register a debit card account as a payment credential to receive funds. In order to send funds to a user's debit card, the payment manager 240 can send a request to credit a payment amount to a recipient's debit card account. In one or more embodiments, the request can comprise an unreferenced refund request. An unreferenced refund request is a refund request that is not attached to a previous funding transaction with the user's debit card account. Processing unreferenced refunds requests result in applying a credit in the amount of the refund request to a recipients debit card account. For example, in the event that a recipient has a negative balance on a debit card account, the request amount may be applied to the negative balance. Likewise, in the event that a recipient has a zero balance on a debit card account, the request amount would result in a positive debit card account balance that the recipient can spend against. Alternatively, the request may include a charge request corresponding to a particular card service that allows the system 100 to transfer money via a proprietary routing method for processing same day payments.

The payment manager 240 of FIG. 2 may perform various functions with relation to coordinating the information received from the communication manger 230 to request and accept payment requests, and to coordinate the payment process. For example, the payment manager 240 can create and store payment credentials. More specifically, a user (e.g., senders and recipients) may already have accounts with the network application, and thus already be registered users, or may still need to set up an account. In one embodiment, at least some of the users can also be members of a social-networking system and already have identifiers ("IDs") and user profiles associated with social-networking accounts that are also used when messaging using the system 100. Alternatively, other users may not be members of the social-networking system and need to create an account to become a registered member of the system 100. In this example, the payment manager 240 can receive date from these users (via the client application 202) and create an account, and then create a unique ID and user payment profile for these users, which will be referenced later during the payment process. In some cases, the payment manager 240 may also augment user profiles of previous social-networking users to include payment profile features that may have been absent.

In setting up or augmenting the account, a user can submit one or more payment credentials, such as a credit card, a debit card, a deposit account or other bank accounts, gift card accounts, store credit accounts, etc. When adding methods of payment, the user can be required to submit card and/or account numbers, expiration dates, security codes, transfer or routing identification numbers, and bank information required for money transfers. The user can also create an authorization code such as a personal identification number (PIN), or use a security code of a credit card, e.g., when providing only a single payment method, or provide some other authorization code. The user can also select a default method of payment.

The user payment profiles stored by the user profile database 236, accordingly, can include user (or group) IDs created uniquely for each registered user (whether as a social-networking user and/or as a messaging user). The user profile database 236 can provide storage for payment credentials of users of the network application 204. For example, the user can create an "account" with the network application 204, which allows a user to provide the payment information to the network application 204. The network application 204 can then save that payment information in the user profile database 236. In one or more embodiments user profile database 236 can store in relation to the user one or more of: a first name, a middle name, a last name, a payment card number (e.g., a credit card, debit card), an expiration date (year and/or month) of the payment card, a card security code of the payment card (e.g., a Card Verification Value (CVV or CVV2)), a billing address (including street name, house number, city, state or province, zip code, country, etc.) associated with the payment card, a phone number associated with the payment card, one or more shipping addresses (including similar fields as the billing address). When the payment card comprises a debit card, the profile storage module can also store a personal identification number (PIN) for the debit card. In an embodiment where the network application 204 comprises a social-networking system, the payment information stored in the user profile database 236 may be associated with a node of the node storage 252 that represents the user.

In one or more additional embodiments, the payment manager 240 can communicate with the risk calculator 238 to determine a risk associated with a sender, a recipient, and/or a particular payment transaction. Specifically, the risk calculator 238 can determine whether the sender/recipient is a fraudster based on information associated with the sender/recipient in order to prevent fraudulent payment transactions. For example, the risk calculator 238 can determine the likelihood of fraudulent activity based on activity or information associated with the sender/recipient in connection with the network application. Determining a risk associated with users involved in payment transactions can particularly be useful when processing push-to-debit transactions.

For example, in one or more embodiments, the network application 204 can determine whether a risk associated with the sender or the recipient satisfies a predetermined threshold. In particular, the network application 204 can determine whether the sender or the recipient is a fraudster (e.g., a scam account or software posing as a real person) based on a "realness" score.

For example, if the risk associated with the sender is below a predetermined threshold (i.e., a high risk level), the network application 204 can determine that the sender is likely a fraudster and notify the payment engine 206 that the sender is a fraudster. If the sender has a high-risk level, the payment engine 206 can stop a payment transaction between the sender and the recipient. Similarly, if the risk associated with the recipient is below a predetermined threshold, the network application 204 can determine that the recipient is likely a fraudster and notify the payment engine 206 that the recipient is a fraudster.

To illustrate, the network application 204 can determine a realness score for a user based on whether the user has been tagged has been tagged in media posted to the social networking system by one or more co-users, whether co-users of the user recognized the user's previous one or more birthdays (i.e., wished the user a "happy birthday"), the number or volume of messages exchanged between the user and co-users of the user via the network application 204, whether co-users of the user have indicated agreement or solidarity (i.e., "liked") with posts made by the user, and/or whether co-users of the user have commented on posts made by the user. Additionally or alternatively, the network application 204 can determine whether the user has been a member of a social networking system for a predetermined amount of time, lives in a pre-approved origination location, has a predetermined level of social network activity with a destination location, has a threshold realness score, etc. In another example, the network application 204 can determine a risk for a user based on the relationship between the user and a co-user, including whether the user and the co-user are friends on a social networking system, are within a number of degrees of separation, etc. Additionally, the network application 204 can use information about the payment transaction to determine whether the payment transaction is fraudulent or erroneous, such as based on the payment amount (e.g., the payment amount includes an unrealistic amount).

In additional embodiments, after determining a risk associated with the sender and/or recipient, the network application 204 can perform one or more actions in association with the risk. Specifically, the network application 204 can perform an action that allows the network application 204 to verify the identity of the user. For example, the network application 204 can request information from the user that indicates the user is who the user purports to be. To illustrate, the network application 204 can request a password entry, a number of digits of a registered payment credential for the user, a personal security question, an upload of a visual identification (e.g., a photo), or other identification mechanism based on the risk level or realness score of the user.

In additional or alternative embodiments, the network application 204 can automatically perform one or more actions with respect to the payment message or a payment transaction in response to determining a risk level of the user. Specifically, the network application 204 can perform an action that affects the payment message or a corresponding payment transaction between the sender and the recipient without requesting additional information from the user. For example, the network application 204 can allow the payment transaction, hold the payment transaction pending for review (e.g., by a bank of the user's payment credential), block the payment transaction, disable the user's account, or process the transaction without using an intermediate account (e.g., directly from the sender's account to the recipient's account).

In any event, upon receipt of a payment message from a sender, the payment manager 240 can detect the user (or group) ID of the sender and retrieve the payment profile for that user (or entity). The payment manager 240 can then generate a transaction package (e.g., a "payment drone") that includes a transaction ID associated with a payment amount, the sender, and the recipient. The transaction ID can help the system 100 track money from the sender's account, within the system in a temporary or intermediate account, and to the recipient's account. In some instances, the system 100 can provide users access to the transaction ID to follow the movement of money during a corresponding payment transaction.

The transaction package can also include a default payment method, and related information, unless the sender selected to send a payment to the recipient with an alternative payment method, in which case the transaction package can include payment information for the alternative payment method. The payment manager 240 may then send the transaction package to the payment network 115 to initiate the payment authorization process.

The payment manager 240 can perform various other additional steps and methods in order to effectively manage the payment process. In one or more embodiments, for example, upon receiving a payment message the payment manager 240 can generate a transaction identifier (or simply "transaction ID") and associate the transaction identifier with the payment message and/or the payment information within the payment message. For instance, upon generating a transaction ID, the payment manager 240 can send the transaction ID and the payment information to the transaction database 242. The transaction database 242 can include a data table or similar data matrix that stores transaction information according to transaction ID.

The transaction database 242 of FIG. 2 can provide storage for each transaction (such as in the form of a graph object), attempted or completed, the transaction ID, a date, an amount of the transaction, the payment method used, associated messages interchanged between sender and recipient related to the transaction, and any other information gathered on the transaction. With this information, the payment manager 240 can provide, upon request, a summary of one or more transactions to users as a history of payments requested, payments declined and payments completed.

In one or more embodiments, after a transaction ID is associated with a particular payment message, the transaction ID can be included or embedded within substantially all communications within the system 100 relating to the particular payment. As such, the transaction ID allows the payment manager 240 to manage and process a large number of payments in an organized fashion. For example, the payment manager 240 can include instructions to include the transaction ID in any information sent to the client devices 104a, 104b. In return, the messaging handlers 210 can also include the transaction ID in any information sent from the client devices 104a, 104b to allow the payment manager 240 to efficiently and reliably identify a particular transaction to which the information corresponds.

In one or more embodiments, the transaction ID can be associated with one or more sender identifiers, recipient identifiers, thread identifiers (e.g., identifying a messaging thread between the sender and the recipient), payment amounts, payment methods (e.g., sender accounts), deposit methods (e.g., recipient accounts), transaction history, current transaction status, as well as other transaction information. In one or more embodiments, the transaction database 242 maintains the transaction information in the form of one or more graph objects that are updated with any updates or actions with respect to a transaction.

Also, as previously mentioned, the account manager 244 of the payment engine 206 can maintain one or more intermediate or temporary accounts. The temporary accounts can function as a type of "hot account" that provides funding for a deposit to be made into a recipient account prior to the settlement or actual funding of the payment from the sender's account. For instance, with some payment methods, the funding of the payment may take several hours or even days for money to be debited from the sender's account. However, a payment authorization request can verify and reserve funds to satisfy a payment. Thus, upon receiving a successful response from a payment authorization request, the payment manager 240 can fund the payment amount from a temporary account to provide a shorter time for the payment to arrive in the recipient's account. Once the payment funds from the sender's account, the temporary account is renewed for the amount of the payment.

Figure 3A:
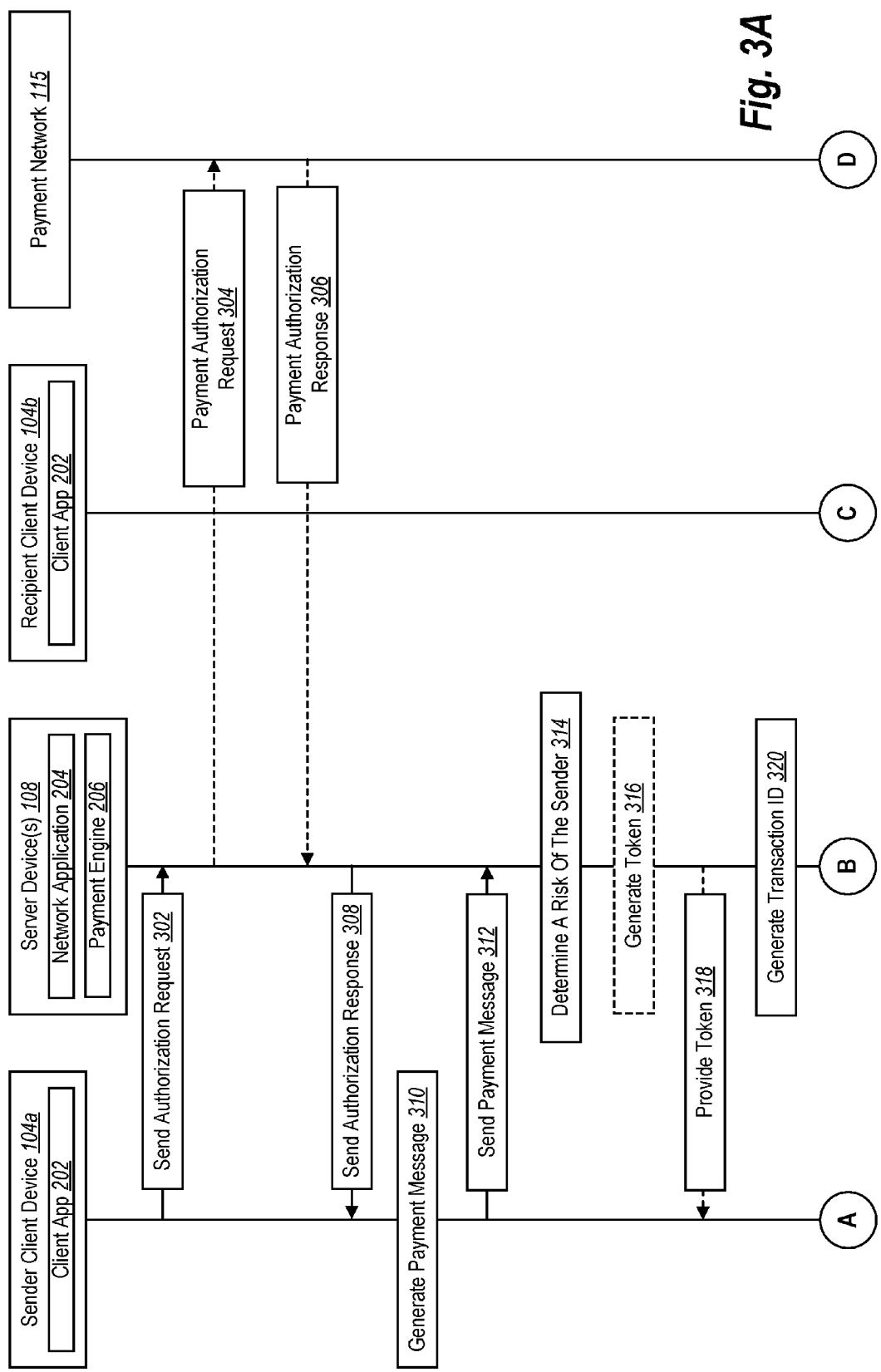
FIGS. 3A-3C illustrate a sequence-flow diagram illustrating interactions as part of a payment process between a sender and a recipient in accordance with one or more embodiments.
Figure 3B:
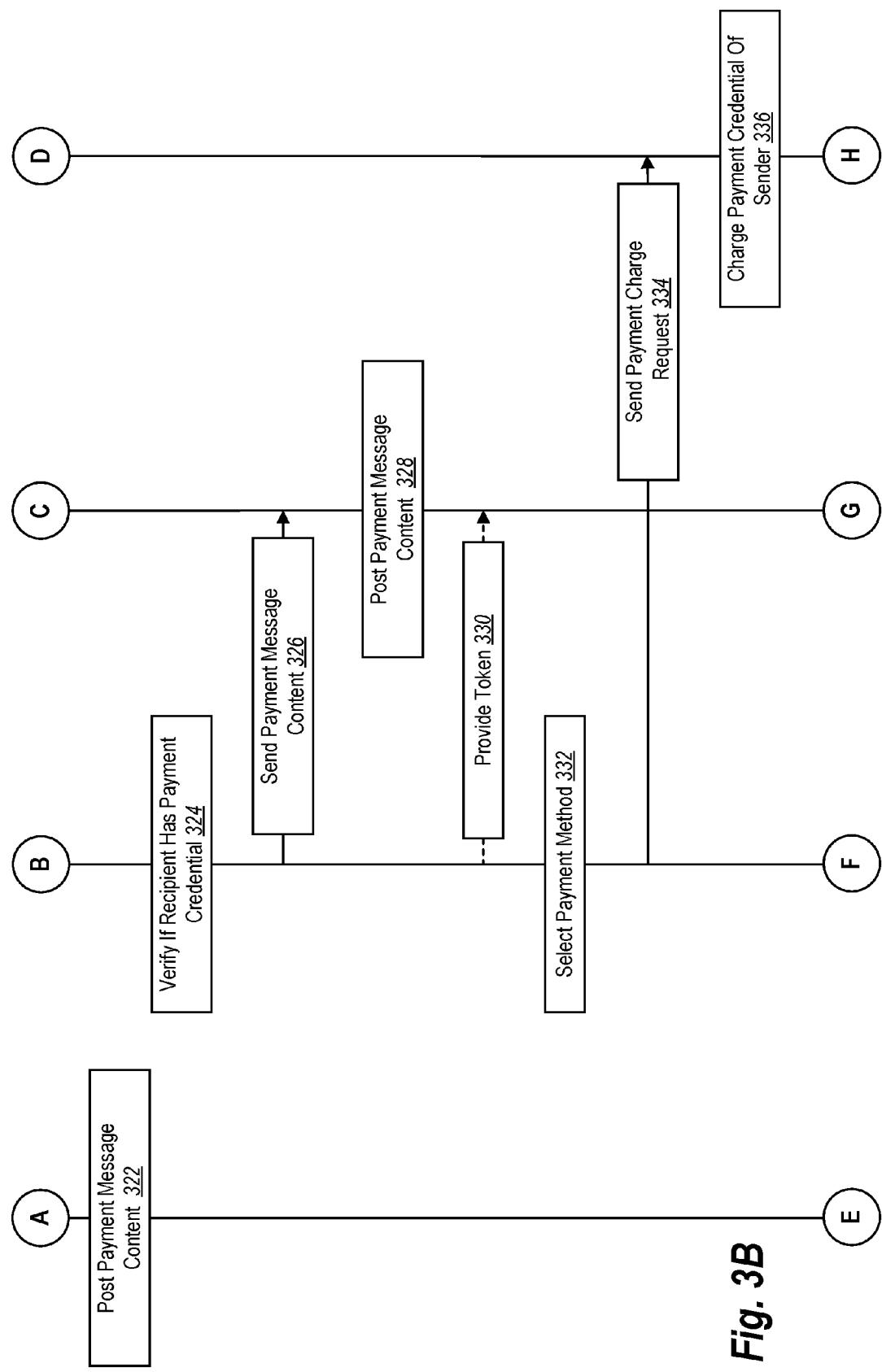
Figure 3C:
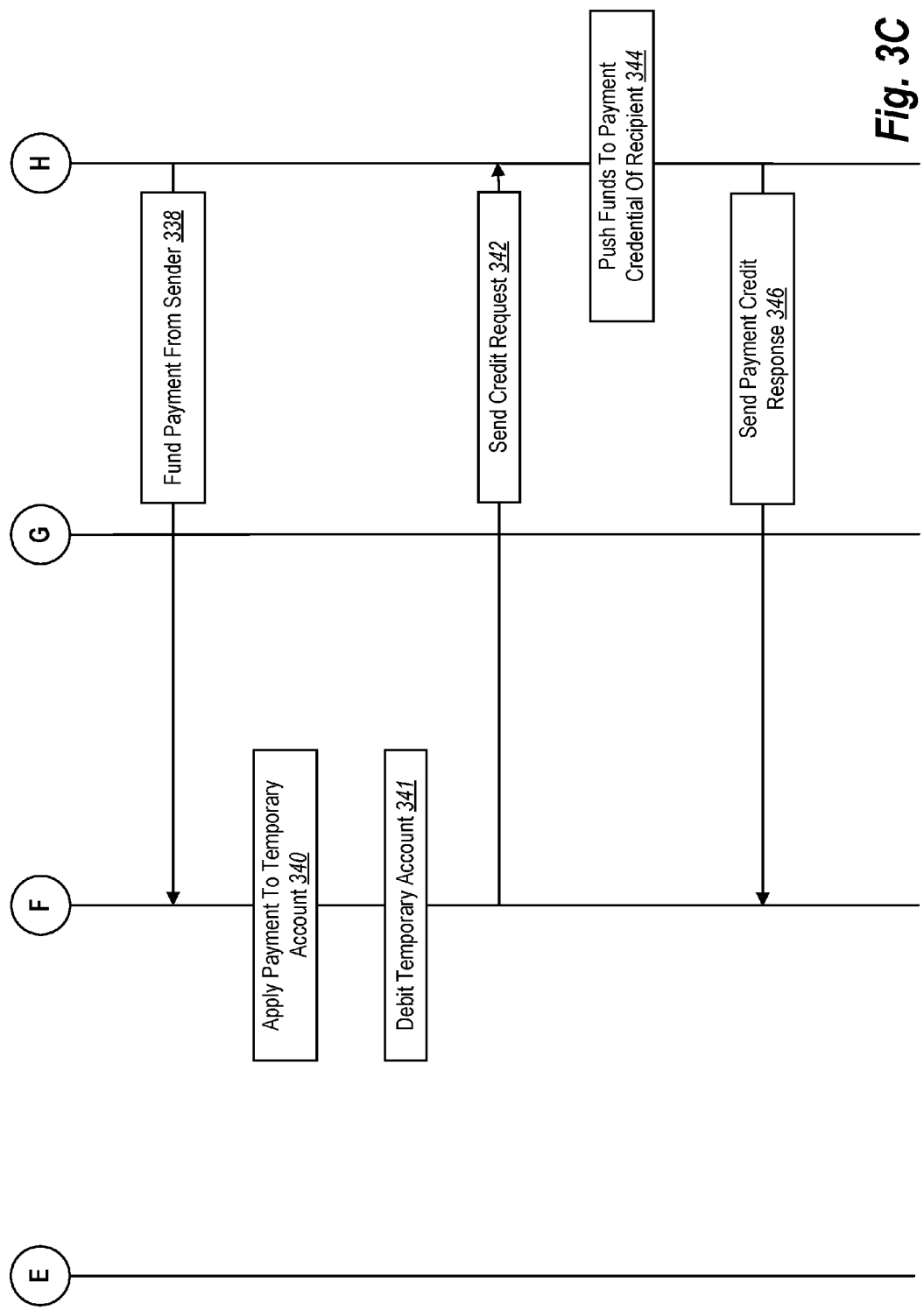

As discussed, the systems and components discussed above with reference to FIGS. 1-2 can allow users of a message system to easily, effectively, and securely send and receive payments via an integrated messaging and payment system 100. FIGS. 3A-3C illustrate example process diagrams of one or more example embodiments of processes implemented by system 100 discussed above. Consistent with system 100 illustrated in FIGS. 1 and 2, FIGS. 3A-3C illustrate a sender client device 104a with a client application 202, a recipient client device 104b with a client application 202, server device(s) 108 that supports a network application 204 and a payment engine 206, and a payment network 115.

In one or more embodiments, a process for a user sending a payment to another user via the system 100 can begin with a sender user (or simply "sender") associated with the sender client device 104a providing user input to the client application 202 to send 302 an authorization request. Specifically, the sender can associate a payment credential with a user account for the sender for performing a payment transaction with other co-users in the system 100. The client application 202 can cause the sender client device 104a to send the authorization request to the payment system, as shown in FIG. 3A.

Optionally, the payment engine 206 can send 304 an authorization request against the sender's payment credential (e.g., debit card of the sender) for the amount of the payment or another amount (e.g., $0.01 or $100.00) to the payment network 115, which can approve or deny payment authorization. The payment network 115 can then forward 306 the payment credential authorization response to the payment engine 206. One will appreciate that the optional authorization request can take place earlier or later in the timeline. In alternative implementations, the payment engine 206 can send an authorization request against the payment credential of the sender for the amount of the payment as part of the payment transaction request 338. The payment engine 206 can then send 308 an authorization response to the sender client device 104a to notify the sender client device 104 that the payment credential is authorized for the payment amount.

In one or more embodiments, the sender client device 104a can generate 310 a payment message. In particular, and as described above, the sender can access one or more user interfaces that allow the sender to define a payment to be made to a recipient user (or simply "recipient"). For example, the sender client device 104a can format the payment message to indicate to the payment engine 206 to process the payment transaction based on the type of payment transaction.

To illustrate, the formatting can indicate that the payment transaction is a same day push-to-debit transaction based on the payment method. Specifically, the formatting can include parameters that indicate to the payment network exactly how the payment transaction should be processed. For example, the formatting can indicate whether the payment transaction uses VISA Original Credit Transaction (OCT), MASTER-CARD MoneySend, Electronic Funds Transfer (EFT), Automated Clearing House (ACH), unreferenced refund, or other type of fund transfer method according to a particular application program interface (API) for the specific payment network. In some instances, the formatting may depend on the type of credentials available to the recipient (e.g., if the recipient has a payment credential that supports a specific type of payment method, the sender client device 104a can format the payment message accordingly.

In addition, the client application 202 can cause the sender client device 104a to send 312 the payment message to the network application 204, as shown in FIG. 3A. In one or more embodiments, the network application 204 can communicate at least some of the information from the payment message to the payment engine 206. Additionally or alternatively, the payment engine 206 can obtain information from the sender client device 104a in connection with the payment message.

In one or more embodiments, the network application 204 can determine 314 a risk of the sender, as described above. For example, the network application 204 can use information associated with the sender, the recipient, and/or a relationship between the sender and the recipient to determine whether the payment engine 206 processes a payment transaction for preventing fraud. Specifically, the network application 204 can determine a risk associated with the sender and notify the payment engine 206 of the risk to allow the payment engine 206 to determine whether to process payment transactions between the sender and the recipient. Although FIG. 3A illustrates the risk check at a particular point during the processing of a payment transaction, the risk check may occur at any time during the payment transaction before transferring the money to the recipient's account, such as while money is in an intermediate or temporary account, as described below.

Optionally, upon receiving the payment message or after determining the risk, the payment engine 206 can generate 316 a token. The token can allow the payment engine 206 to retrieve the payment credential associated with the sender in response to subsequent payment requests. In particular, the network application 204 can return a random string called a "token" as a pointer to the stored payment credential. The token preferably has no algorithmic relationship with the payment credential, so that the payment credential cannot be derived based on the token itself (such as by merely applying a decryption algorithm to the token). Accordingly, this token is not considered cardholder data, because it is a random string from which it is not possible to extrapolate any sensitive data without the use of the payment engine 206, which contains a list of payment credentials and the tokens to which they correspond. Payment tokens generated by the payment engine 206, can allow for validation of a payment request as explained in greater detail below. The payment engine 206 can provide 318 the token to the sender client device 202 for validating the sender and/or payment credential in subsequent payment transactions.

Alternatively, the client application 202 can obtain, identify, or otherwise discover a user identifier for the sender for the network application 204 and/or the payment engine 206. For example, the client application 202 can access an obfuscated (e.g., hashed, encrypted, or otherwise algorithmically transformed) user identifier of the user existing on the computing device 104a of the sender. This user identifier can identify a user profile/account for that user of the network application 204 (e.g., a social networking application) and/or the payment engine 206. In one or more embodiments of the present disclosure, the user identifier is accessed from a portion of shared memory accessed by or reserved by the network application 204 and/or the payment engine 206, and may only exist if the user is currently "logged on" to the network application 204. In one or more other embodiments, the user identifier is accessed from a cookie (e.g., HyperText Transfer Protocol (HTTP) cookie) or from application cache (e.g., a HyperText Markup Language version 5 (HTML5) application cache) on the user's computing device 104a.

The client application 202 can send the obfuscated user identifier with the payment message 302. In one or more embodiments, both the network application 204 and the payment engine 206 can then verify that the obfuscated user identifier is valid. This process may serve as the authentication for the sender, as the existence of a proper obfuscated user identifier for the network application 204 and the payment engine 206 on the user's computing device 104a indicates that the sender has already been authenticated at the server device(s) 108. Authenticating the sender allows the sender to communicate with other users in connection with the network application 204 and enter payment transactions in connection with the payment engine 206.

In the event that the payment engine 206 does not validate the sender or the payment credential, the payment engine 206 can send a communication to the sender client device 104a to cause the client application 202 to present an error message to the sender that indicates the payment could not be authorized. In one or more embodiments, the error message can include a prompt for the sender to provide additional authorization information, agree to terms and conditions, or otherwise verify their identify. After which the sender client device 104a can send a revised payment request to the payment engine 206. The network application 204 can then attempt to validate the sender/payment credential. If the network application 204 cannot validate the sender/payment credential, then the payment engine 206 may terminate the payment transaction based on the payment message 302.

Upon providing the token or validating the sender/payment credential, the payment engine 206 can generate 320 a transaction ID, as illustrated in FIG. 3A. As described above, the payment engine 206 can associate a unique transaction ID to each payment message received. The payment engine 206 and the network application 204 can communicate to use the transaction ID within various files, objects, messages, and other information to allow the network application 204 to efficiently identify and process messages, status updates, and other information with respect to each payment made via the network application 204. For example, and as described above, the payment engine 206 can associate the transaction ID with a graph object that maintains information that corresponds to processing a payment message.

In response to sending the payment message 310 or in response to a signal from the network application 204 or the payment engine 206, the client application 202 can post 322 the payment message content. For example, the user interface manager 208 can add the text of the payment message to a messaging thread having a message exchanged between the sender and the recipient as a sent message.

Similarly, the network application 204 can send 326 the payment message content to the recipient client device 104b so that the client application 202 of the recipient client device 104b can post 328 the payment message content. For example, the user interface manager 208 can add the text of the payment message to a messaging thread having messages exchanged between the sender and the recipient as a received message.

Before, after, or while sending the payment message content 326 to the recipient client device 104b, the payment engine 206 can use information provided by the payment message to determine 324 if the recipient has a payment credential on file that supports same day payments (e.g., a debit card account). For example, the payment engine 206 can use a network identifier (e.g., username or other ID) to lookup a user profile for the recipient in the user profile database 236 to determine if the user profile has a payment credential associated therewith. If the recipient has a payment credential, the payment engine 206 can validate the recipient and/or the payment credential. Alternatively, if the recipient does not have a payment credential, the payment system can request that the recipient provide a payment credential. Optionally, upon validating the payment credential, the payment engine 206 can provide 330 a token to the recipient client device 104b similar to the token for the sender.

At this point, or before depending upon whether the recipient already had a payment credential on file, the payment engine 206 can perform a validation step to validate the recipient and/or the payment credential. For example, the client application 202 can obtain, identify, or otherwise discover a user identifier for the recipient for the network application 204 as described above in relation to validating the sender. The client application 202 on the recipient client device 104b can send the obfuscated user identifier to the network application 204 in response to receipt of the payment message content. The network application 204 can then verify that the obfuscated user identifier is valid. This process may serve as the authentication for the recipient, as the existence of a proper obfuscated user identifier for the network application 204 on the recipient's computing device 104b indicates that the recipient has already been authenticated by the network application 204.

In the event that the network application 204 does not validate the sender or the payment credential, the network application 204 can send a communication to the recipient client device 104b to cause the client application 202 to present an error message to the recipient that indicates the payment could not be authorized. In one or more embodiments, the error message can include a prompt for the recipient to provide additional authorization information, agree to terms and conditions, or otherwise verify their identify.

The payment engine 206 can select 332 a payment or routing method for transferring the funds to a payment credential of the recipient. In one or more embodiments, the payment engine 206 can determine which payment method to use based on payment credentials available to the recipient. For example, the payment engine 206 can select a payment credential that supports same day processing. Additionally, or alternatively, the payment engine 206 can select a payment method based on a formatting of the payment message from the sender. In other embodiments, the payment engine 206 can determine which payment method to use based on a risk associated with the sender and/or the recipient, a cost to the payment engine 206, a cost to the sender/recipient, a reliability of the payment method, and/or how quickly the money shows up in the recipient's account.

According to one or more embodiments, each of the payment methods can take a specific amount of time to fully process. For instance, the payment engine 206 can process an instant payment method that substantially instantaneously transfers money from the sender's account to the recipient's account (e.g., a fast push-to-debit transaction). Another payment method can include a substantially instantaneous transfer to the recipient's account using a temporary account with reserve funds, as described in more detail herein, prior to receiving the funds from the sender's account. Additionally, or alternatively, a payment method can include a payment using an unreferenced refund, which may take as long as 2 or 3 days. Other payment methods can include EFT or ACH payments, which may include a broader range of processing times (e.g., 2 to 7 days) as determined by the payment engine 206 or payment network 115.

Additionally, each payment method may have a specific processing cost. Specifically, payment methods with faster processing times may be more costly to the payment engine 206 and/or payment network 115 than payment methods with slower processing times. For example, substantially instantaneous payment methods may cost a higher amount (e.g., 20 cents) to process than unreferenced refund or EFT/ACH payment methods (e.g., 1 cent). Alternatively, each different payment method can have a different associated cost. For example, an instant payment method can cost a first amount, an instant payment method using a temporary account can cost a second amount, an unreferenced refund payment method can cost a third amount, and EFT/ACH payment methods can cost a fourth amount. In one or more embodiments, the payment engine can determine that a user has a low risk or is trusted. In such embodiments, the payment engine pay process a payment so it appears as an instant push-to-debit payment (OCT/Moneysend), but may actually perform an ACH but push money to the recipient prior to receiving money from the sender. In such, instances the network application can retain the fees associated with an instant transaction.

In one or more implementations, the payment engine 206 can pass some or all of the cost of the payment transaction to the user(s). For example, the payment engine 206 can determine whether to charge the sender and/or the recipient for the payment based on the risk/trust level associated with the sender and/or the recipient. To illustrate, if the sender has successfully previously performed a certain number of transactions with the payment engine 206, the payment engine 206 can opt to discount or not charge the sender for the payment transaction. This may allow the payment engine 206 to reward and/or further incentivize the sender to use the payment engine 206 to send and receive payments.

As mentioned, the payment engine 206 can select the payment method based on various criteria. For example, the payment engine 206 can select a payment method by first determining a risk or trust level associated with the sender and/or the recipient. To illustrate, if the payment engine 206 determines that the sender and/or the recipient is low risk or if the sender and/or the recipient has performed successful payment transactions via the payment engine 206 previously, the payment engine 206 can select the payment method that uses a temporary account with reserve funds to pay the recipient. Thus, the payment engine 206 can save the cost of performing an instant payment transaction via the payment engine 115. Alternatively, if the payment engine 206 determines that the sender and/or recipient is high risk or is not trusted, the payment engine 206 can select an instant payment method via the payment network 115.

In one or more alternative embodiments, the payment engine 206 can opt to use a slower, but less costly, payment method in response to determining that the risk or trust level of the user is below a certain threshold. For example, if the payment engine 206 determines that the risk or trust level of the user is below a first threshold, the payment engine 206 can process the payment using an unreferenced refund. For implementations in which each payment method has a separate associated cost, if the payment engine 206 determines that the risk or trust level of the user is below a second threshold that is lower than the first threshold, the payment engine 206 can process the payment via EFT/ACH. By selecting the type of payment method based on the risk or trust level of the sender/recipient, the payment engine 206 can minimize the financial risk for processing payment transactions.

In some embodiments, the payment engine 206 may allow the sender to select the type of payment method. In particular, the payment engine 206 can present a list of payment methods available to the sender to allow the sender to select a standard push-to-debit transaction or a fast push-to-debit transaction. Upon detecting the selection of the payment method by the user, the payment engine 206 can issue a charge for the selected payment method and process the payment account accordingly. By providing the different options to the sender, the sender can opt to pay more to process the payment transaction using a substantially instantaneous payment method or to pay less or nothing using a slower payment method (e.g., unreferenced refund, EFT/ACH). For example, the user can select to send an instant payment (OCT/Moneysend) for a first larger transaction amount (e.g., 20 cents) that takes a few minutes or less to complete, a unreferenced refund for a second transaction amount (e.g., less than 20 cents but more than a third transaction amount) that takes 2-3 days to complete, or a ACH/EFT payment that costs a third smaller amount (e.g., 1 cent) but takes up to 7 days to complete.

In one or more embodiments, the system can separately process the funding request from the sender's account and deposit the payment in the recipient's account. In one or more embodiments, for example, the sender's account may be accessible on a first payment network, while the recipient's account is available on a second payment network. In such a situation, in order to process the payment, the payment engine 206 can act as an intermediary for processing the payment.

The payment engine 206 can send 334 a payment charge request to the payment network 115 that requests the payment amount be charged 336 to the sender's payment credential and sent to the payment engine 206. In one or more embodiments, the payment engine 206 can send the payment charge request and the payment message to the recipient client device in parallel. For example, the payment engine 206 can send the payment charge request to the payment network while also sending the payment message to the recipient client device 104b.

In one or more additional embodiments, the payment engine 206 can format the payment charge request according to the type of payment method selected. For example, the payment engine 206 can determine that the payment method is a same day push-to-debit transaction based on the formatting of the payment message from the sender client device 104a, and can format the payment charge request to cause the payment network (e.g., by applying additional formatting or by sending information from the formatted payment message to the payment network) to transfer the funds from the sender's payment credential to the recipient's payment credential accordingly. To illustrate, the formatted payment charge request can include metadata that indicates the type of payment method associated with the payment charge request (e.g., for substantially instant processing and transfer of funds).

In response to the payment charge request, the payment network 115 can fund 338 the payment from the sender's account by electronically transferring money from the sender's account to the payment engine 206. Upon receiving the electronic transfer, the payment engine 206 can apply 340 the payment to a temporary account. For example, the payment engine 206 can apply the payment to an intermediate account that the payment engine 206 uses to transfer funds to a payment credential of a recipient. In one or more embodiments, the payment engine 206 can create a new account to which to apply the payment. Alternatively, the payment engine 206 can apply the payment to a master temporary account that includes various other payments organized and identified by the unique transaction ID associated with each payment.

The payment engine 206 can deposit the payment into the recipient's payment credential. In particular, and as illustrated in FIG. 3C, the payment engine 206 can first debit 341 the temporary account (before or after receiving the payment from the payment credential of the sender) for the payment amount in connection with the transaction ID associated with the particular payment, and then electronically transfer the payment to the recipient's payment credential via the payment network 115, or another payment network. In particular, the payment engine 206 can send 342 a credit request including the payment amount, associated with the same transaction ID, from the temporary account to the payment network 115 with instructions to push 344 the funds to the payment credential of the recipient in a substantially instant push-to-debit payment transaction based on the formatting of the payment message, such that the funds are available to the recipient within minutes.

After pushing the funds to the payment credential of the recipient, the payment network 115 sends 346 a payment credit response to the payment engine 206 upon successfully depositing the payment into the recipient's account. To complete the payment process, the network application 204 can send a payment complete status update to the sender client device 104b and a payment claimed status update to the recipient client device.

In one or more additional or alternative embodiments, the payment engine 206 can transfer the money to the recipient's payment credential prior to receiving funds from the sender's payment credential using reserve funds in an intermediate account to speed up the transfer of funds from the sender to the recipient (e.g., in a transaction from a credit card of the sender to a debit card of the recipient), as determined when the system 100 selects a payment method as described above. In alternative embodiments, the payment engine 206 can cause the sender's payment account to transfer money directly to the recipient's payment account, rather than transferring the money to a temporary account at the server device(s) 108.

Additionally, the system 100 may periodically perform checks to verify settlements for the time period. Specifically, the system 100 may compare payment messages stored in a messaging database to processed payment transactions for each payment network to verify that total payment amounts associated with all payment transactions processed for the period match the amounts in all payment messages. If the totals do not match, the system 100 can categorize the difference as revenue, loss, or other category based on the type of difference.

As will be described in more detail below, the components of the system 100 as described with regard to FIGS. 1-3C, can provide, along and/or in combination with the other components, one or more graphical user interfaces. In particular, the components can allow a user to interact with a collection of display elements for a variety of purposes. In particular, FIGS. 4A-4L and the description that follows illustrate various example embodiments of the user interfaces and features that are in accordance with general principles as described above.

Figure 4B:
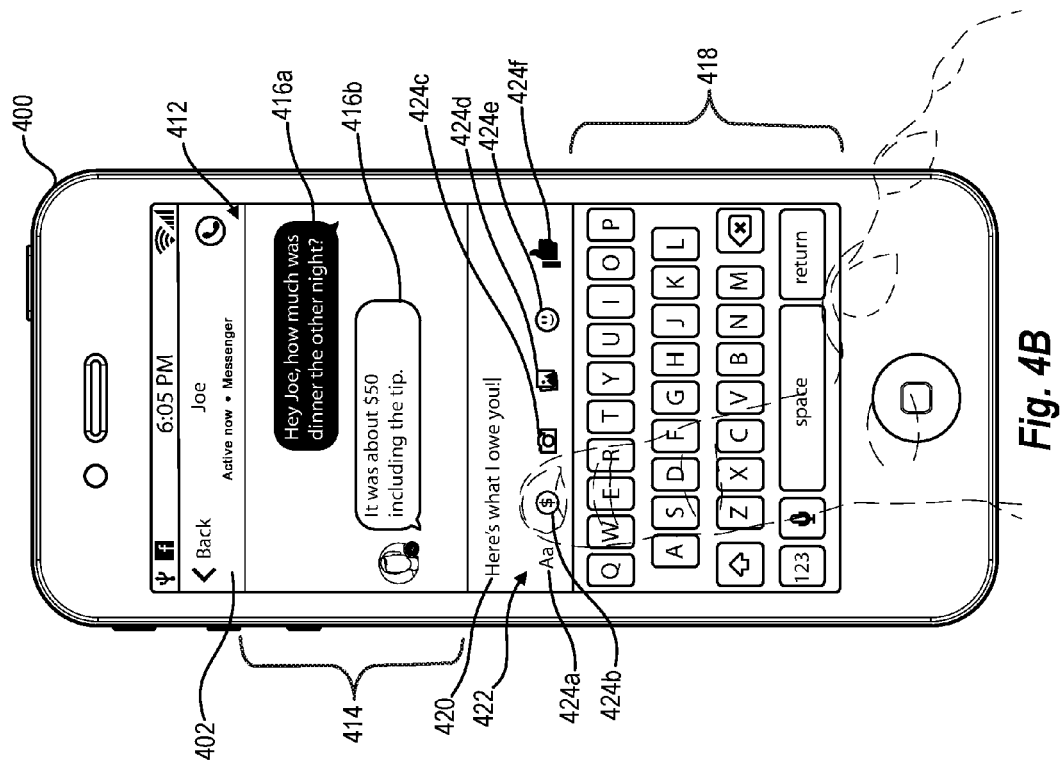
Figure 4A:
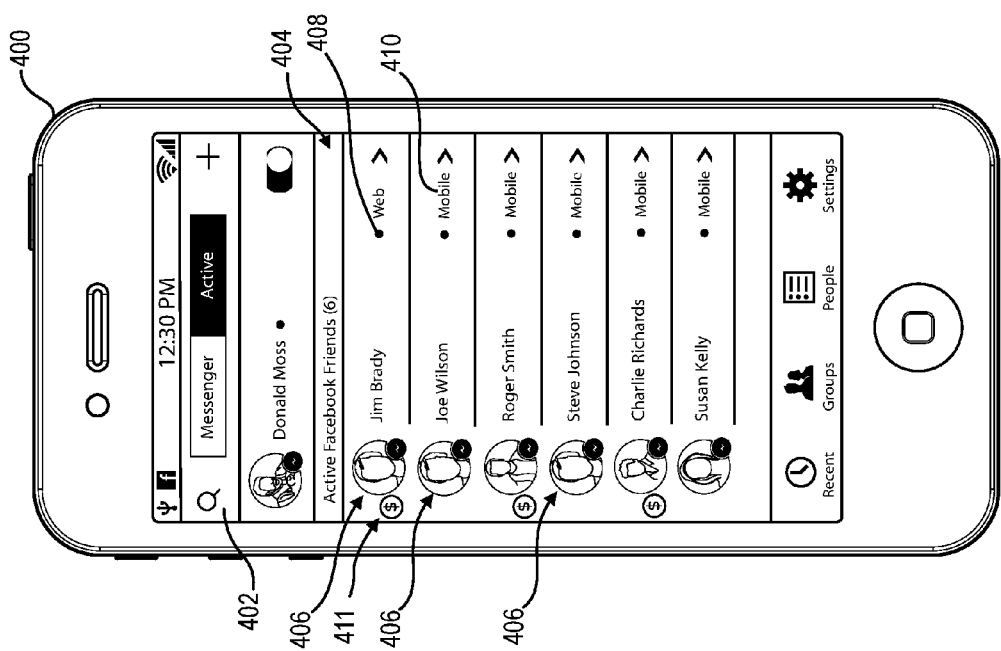

For example, FIGS. 4A-4L illustrate various views of GUIs provided by the client application 202 to facilitate electronic messaging and sending and receiving payments. In some examples, a client device (i.e., client device 104a, 104b) can implement part or all of the system 100. For example, FIG. 4A illustrates a client device 400 that may implement one or more of the components of the client device 202. As illustrated in FIG. 4A, the client device 400 is a handheld device, such as a mobile phone device (e.g., a smartphone). As used herein, the term "handheld device" refers to a device sized and configured to be held/operated in a single hand of a user. In additional or alternative example, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

The client device 400 can include any of the features and components described below in reference to a computing device 700 of FIG. 7. As illustrated in FIG. 4A, the client device 400 includes a touchscreen 402 that can display or provide user interfaces and by way of which user input may be received and/or detected. As used herein, a "touchscreen display" refers to the display of a touchscreen device. In one or more embodiments, a touchscreen device may be a client device 104a, 104b with at least one surface upon which a user may perform touch gestures (e.g., a laptop, a tablet computer, a personal digital assistant, a media player, a mobile phone). Additionally or alternatively, the client device 400 may include any other suitable input device, such as a touch pad or those described below in reference to FIG. 7.

As noted previously, the system 100 can integrate an electronic messaging system and an electronic payment system. FIG. 4A illustrates a people or contacts user interface 404 provided by the user interface manager 208 on the touchscreen 402. The contacts user interface 404 can provide a list of contacts of a user ("Donald") of the client device 400. In particular, the contacts user interface 404 can list "friends" or contacts 406 with which the user is connected or associated within the system 100.

The contacts user interface 404 can further provide one or more statuses of each of the contacts 406. For example, the contacts user interface 404 can indicate whether a given contact or co-user is active (e.g., logged into the client application 202, connected to the Internet, recently performed an action using the client application 202) by via of a first status indicator 408. The first status indicator 408 can comprise a graphical user interface object such as an icon. In one embodiment, the first status indicator 408 comprises a dot of a first color (e.g., green) next to a name of each co-user who is active. Along related lines, the first status indicator 408 can also include a dot of a second color (e.g., grey) next to users who are inactive.

The contacts user interface 404 can indicate whether a given the type of device a contact or co-user is currently using via a device indicator 410. The device indicator 410 can comprise a graphical user interface object such as an icon. For example, as shown the device indicator 410 can comprise the words "Web" indicating that a co-user is active or logged into the client application 202 using a personal computer. Along similar lines, the device indicator 410 can include the word "Mobile" to indicate that a given contact is active or logged into the client application 202 using a mobile device, such as a mobile phone. Additionally or alternatively, the device indicator 410 can indicate a brand or model of the client device of a given co-user.

Depending upon privacy settings of given co-users, the contacts user interface 404 can further include a payment status indicator 511. The payment status indicator 511 can indicate whether a given co-user is enrolled or capable of receiving or sending electronic payments using the system 100. For example, the presence of a payment status indicator 511 next to the name of a given co-user can indicate that the given co-user has a payment credential associated with their account or profile with the system 100 or network application 204. The payment status indicator 511 can comprise a graphical user interface object such as an icon. For instance, as shown by FIG. 4A, the payment status indicator 511 can comprise a dollar sign or other symbol commonly associated with payment transactions.

The client application 202 can receive notifications or indications of the statuses of the contacts associated with the user of the client device 400 from the status manager 232 of the network application 204. For example, the client applications 202 can send notifications or status updates to the network application 204 to indicate when the client applications 202 are active or online. The status manager 232 can then send the statuses of contacts associated with a given user to the client devices 104a associated with the given user. Along related lines, the status manager 232 can determine if a given user has a payment credential associated with their profile and can provide indications to the client device 400 of contacts of the user who have the ability to send and receive payments.

One will appreciate in light of the disclosure herein the integration of an electronic messaging system and an electronic payments system can provide significant advantages over conventional payment applications. In particular, a user can access a contacts user interface 404 and determine which co-users are active, and thus, available to chat about a payment transaction or even notice the receipt of a payment. Furthermore, the contacts user interface 404 can optionally allow a user to know which co-users have a payment credential. Thus, the contacts user interface 404 can inform the user whether a co-user will be able to "instantly" receive a payment or whether the user may need to invite the co-user to enroll.

As described above, the system 100 can facilitate receiving and sending data. In one or more embodiments, the communication manager 230 facilitates receiving and sending electronic communications between the computing devices 104a, 104b, 400. Also in one or more embodiments, the user interface manager 208 displays electronic communications sent and received via the communication manager 230. In one or more embodiments, the user interface manager 208 can display electronic communications sent and received via the communication manager 230 in a messaging thread within the messaging graphical user interface. For example, a user can interact with a contact list in the list of contacts of the contacts user interface 404 in order to open a messaging graphical user interface that facilitates exchanging messages with the contact. For example, FIG. 4B illustrates a messaging graphical user interface 412 provided by the user interface manager 208 on the touchscreen 402 upon the user selecting the contact "Joe" from the contacts user interface 404.

As shown, the messaging graphical user interface 412 can include a messaging thread 414 that includes electronic messages 416a sent from an account of a user of the client device 400. Similarly, the messaging thread 414 can include electronic messages 416b received by the account of a co-user (i.e., "Joe"). In one or more embodiments, the user interface manager 208 organizes the messaging thread 414 such that new messages are added to the bottom of the messaging thread 414 so that older messages are displayed at the top of the messaging thread 414. In alternative embodiments, the user interface manager 208 may organize the messages 416a, 416b in any manner that may indicate to a user the chronological or other relationship between the messages 416a, 416b.

The user interface manager 208 provides a variety of electronic communication characteristics to help a user distinguish between electronic communications in the messaging thread 414. For example, as illustrated in FIG. 4B, the user interface manager 208 displays the electronic messages 416a sent from an account of the user of the client device 400 pointed toward one side (i.e., the right side) of the messaging graphical user interface 412. On the other hand, the user interface manager 208 displays the electronic messages 416b received by the messaging handler 212 pointed toward the opposite side (i.e., the left side) of the messaging graphical user interface 412. In one or more embodiments, the positioning and orientation of the electronic messages 416a, 416b provides a clear indicator to a user of the client device 400 of the origin of the various electronic communications displayed within the messaging graphical user interface 412.

Another characteristic provided by the user interface manager 208 that helps a user distinguish electronic communications may be a color of the electronic communications. For example, as shown in FIG. 4B, the user interface manager 208 displays sent electronic messages 416a in a first color and received electronic messages 416b in a second color. In one or more embodiments, the first and second colors may be black and white, respectively, with an inverted typeface color. In an alternative embodiment, the user interface manager 208 may display the electronic messages 416a, 416b with white backgrounds and different colored outlines.

In yet another alternative embodiment, the user interface manager 208 may display the electronic messages 416a, 416b with backgrounds of different patterns, in different fonts, in different sizes or in any other manner that may distinguish the sent electronic messages 416a from the received electronic messages 416b. For example, in one or more embodiments, the user interface manager 208 displays sent electronic messages 416a with white typeface on a blue background. Likewise, in one or more embodiments, the user interface manager 208 displays received electronic messages 416b with black typeface on a grey background.

As mentioned above, the user interface manager 208 may also provide a message input control palette or toolbar 422. As illustrated in FIG. 4B, the user interface manager 208 displays the message input control palette or toolbar 422 as part of the messaging graphical user interface 412. In one or more embodiments, the message input control palette or toolbar 422 includes a variety of selectable message input controls that provide a user with various message input options or other options. For example, in FIG. 4B, the message input control palette or toolbar 422 includes a text input control 424a, a payment control 424b, a camera viewfinder input control 424c, a multimedia input control 424d, a symbol input control 424e, and a like indicator control 424f. In one or more alternative embodiments, the message input control palette or toolbar 422 may provide the input controls 424a-424e in a different order, may provide other input controls not displayed in FIG. 4B, or may omit one or more of the input controls 424a-424e shown in FIG. 4B.

As will be described below in greater detail, a user may interact with any of the input controls 424a-424e in order to compose and send different types of electronic communications. For example, if a user interacts with the text input control 424a, the user interface manager 208 may provide a touchscreen display keyboard 518 in a portion of the messaging graphical user interface 412 that the user may utilize to compose a textual message 420. Similarly, if a user interacts with the multimedia input control 424d, the user interface manager 208 may provide a multimedia content item display area (e.g., for displaying digital photographs, digital videos, etc.) within a portion of the messaging graphical user interface 412. Likewise, if a user interacts with the camera viewfinder input control 424c, the user interface manager 208 may provide a digital camera interface within a portion of the messaging graphical user interface 412 that the user may utilize to capture, send, and add a digital photograph or digital video to the messaging thread 414.

A user may interact with any of the message input controls 424a-e in order to compose and send a message or a payment to one or more co-users via the system 100. For example, in FIG. 4B, a user's finger is shown interacting with the payment control 424b. In one or more embodiments, the user input detector 210 can detect interactions (e.g., a tap touch gesture) of the user's finger or other input device with the payment control 424b. Upon the user input detector 210 detecting a tap touch gesture on the payment control 424b, the user interface manager 208 may display a payment user interface 515 within a portion of the messaging user interface 412 as shown by FIG. 4C.

Figure 4D:
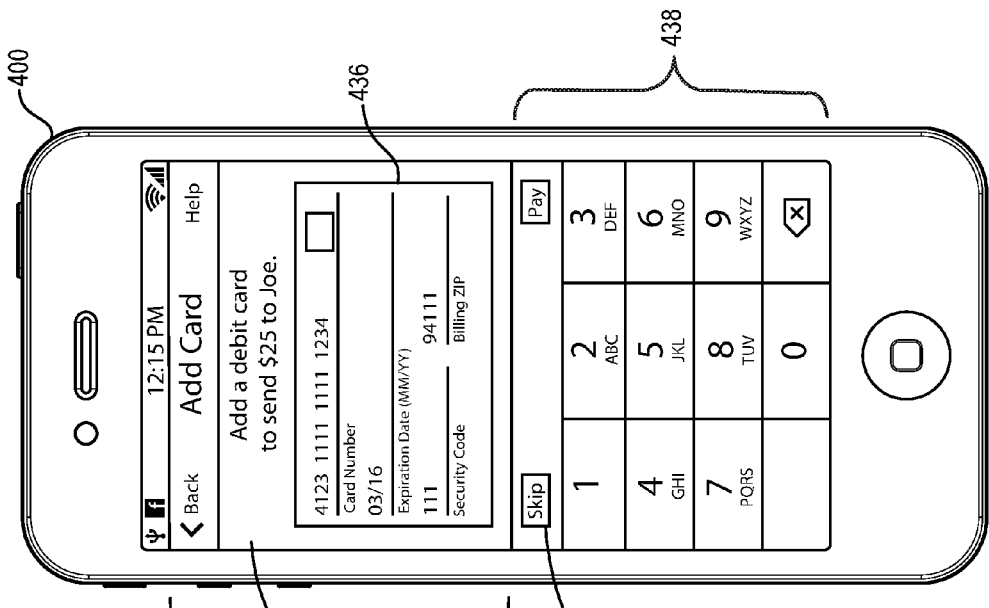
Figure 4C:
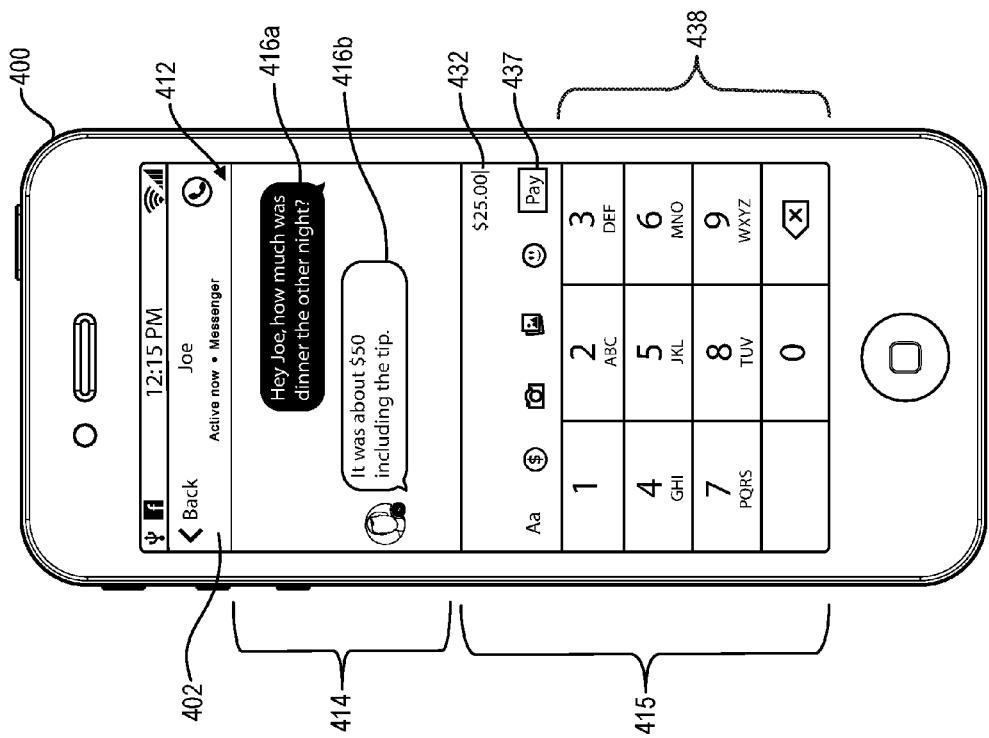

In particular, as illustrated by FIG. 4C, the user interface manager 208 can provide the messaging thread 414 in a first portion (i.e., the upper portion) of the messaging user interface 412. The user interface manager 208 can provide the payment user interface 515 in a second portion (i.e., the lower portion) of the messaging user interface 412. Thus, the user interface manager 208 can allow the user to view the messaging thread 414 and any new messages, while also being able to initiate a payment transaction. In alternative embodiments the user interface manager 102 can arrange the messaging thread 414 and the payment user interface 515 horizontally or in another arrangement other than a vertical arrangement. In still further embodiments, the payment user interface 515 can comprise an overlay over the messaging user interface 412 or a separate user interface.

As will be apparent from the description herein, the payment user interface 515 can allow a user to initiate a payment transaction (send a payment, request a payment, etc.) while simultaneously viewing messages with one or more co-users party to the payment transaction. For example, FIG. 4C illustrates that the user ("Donald") of the device 400 (hereinafter sender) has sent a message: "Hey Joe, how much was dinner the other night?" In response, the co-user ("Joe") participating in the conversation in the messaging thread 414 (hereinafter recipient) has responded: "It was about $50 including the tip." In response to this conversation or messaging session, the sender can desire to send a payment to the recipient. The messaging user interface 412 can allow the sender to do so without having to navigate away from the messaging thread 414 or the messaging user interface 412.

FIG. 4C illustrates an alternative embodiment of a payment interface 515a. As shown, the payment interface 515a can include a numerical keypad 438 that can allow a user to select a payment amount 432 by entering the desired digits in sequence (i.e., by tapping "2" then "5" within the numerical keypad 438 to arrive at $25). The payment interface can display the selected digits to allow the user to verify that the selected digits correspond to the desired payment amount and to modify the selected digits accordingly. One will appreciate in light of the disclosure herein that the payment interface 515 of FIG. 4C is one implementation of a payment interface. In one or more embodiments, a user can select a payment interface 515 from a plurality of different payment interfaces.

In one or more embodiments, in response to the sender selecting a pay element 437 or otherwise causing the payment message to send, the client application 202 can send a request to the network application 204 to determine if the sender has a registered payment credential. In the event the sender is not associated with a registered payment account, a user interface manager 208 can present a credential user interface 434 that allows the sender to register a payment credential, as shown in FIG. 4D. Alternatively, or additionally, a graphical interface can present a one-time payment option that allows a user to input payment information to facilitate a one-time payment (e.g., enter a debit card or credit card number), without requiring the sender to create an account.

One will appreciate that the credential user interface 434 can vary depending upon which type of payment credential the sender selects to enter. In or more embodiments, the user interface manager 208 can provide a list of acceptable payment credentials (e.g., credit card, debit card, gift card, bank account) for sending funds to a recipient. Upon a user selecting a type of payment credential, the user interface manager 208 can provide an applicable credential user interface 434. For example, FIG. 4D illustrates a credential user interface 434 for entering a debit card. As shown, a user can input, via a numerical keypad 438, a debit card number, an expiration date, a security code, and a billing ZIP code associated with the debit card. Upon selecting entering the payment information, the messaging handler 212 can send the payment credential information to the network application 206 for storing a payment credential.

After the sender has entered the payment credentials details (whether by way of an automatic reminder, a manual reminder from the recipient, or by the sender's own choice), the system 100 can continue processing the payment transaction. In one or more embodiments, the client application 202 can provide to the sender an option to use a PIN or other shortcut for processing future payment transactions. For example, the client application 202 can present to the sender a pop-up window 440 or other notification in the messaging interface 412 asking the sender whether the sender wants to create a PIN for sending money for added security, as shown in FIG. 4E.

If the sender selects to enter a PIN for processing future payment transactions, the client application 202 can present a PIN creation interface 442 for creating a PIN, as shown in FIG. 4F. Specifically, the PIN creation interface can allow the sender to create a unique PIN associated with the sender's stored credentials. For example, the PIN can be a 4-digit number (or string of any length) that the sender is can input via the numerical keypad 438 before being able to process a future payment transactions. In some instances, the system 100 can also request that the sender confirm the PIN by re-entering the PIN in order to create the PIN and associate the PIN with the stored credentials.

For future payment transactions, the system 100 can present a PIN input interface by which the sender can input the PIN. Inputting the PIN can allow the system 100 to process the payment transaction using the credentials stored for the user in association with the PIN. Thus, entering the PIN will allow the sender to initiate and complete payment transactions without remembering the credentials every time the sender wishes to send money to another user via the system 100.

According to some embodiments, the system 100 can allow a sender to cancel the payment transaction after pressing the pay element 437 and prior to completing the payment transaction to transfer funds to a payment credential of a recipient. For example, FIG. 4G illustrates a cancel element 444 that allows a user to cancel a push-to-debit payment transaction. To illustrate, if the sender selects the cancel element 444, the system 100 stops the process of transferring funds to a payment credential of the recipient. The system 100 can also stop the process of transferring funds from a payment credential of the sender and/or begins a process to credit the funds back to the payment credential of the sender.

In one or more additional embodiments, the system 100 can allow the user to cancel the payment transaction within a predetermined amount of time. Specifically, the system 100 may set a predetermined amount of time to allow a sender to cancel a payment transaction before the payment transaction is irreversible. To illustrate, the payment interface 515 can include a graphical timer associated with the cancel element 444 to indicate an amount of time before the user is unable to cancel the payment. For example, the graphical timer can include a timer bar around the cancel element 444 that indicates an amount of time left for canceling the payment. Alternatively, the payment interface 515 can provide another type of notification to indicate the amount of time left to cancel the payment (e.g., in a notification bar of the client device 400 or within another area of the messaging interface 412).

According to one or more embodiments, the predetermined amount of time may be associated with an amount of time needed to process the payment transaction and to begin transferring funds to a payment credential of the recipient. For example, the predetermined amount of time may be associated with an amount of time before the system 100 transfers the money from an intermediate account managed by the system to the payment credential of the recipient (e.g., during a 15 minute period or other predetermined time period). Alternatively, the predetermined amount of time may be associated with an amount of time that the system 100 delays prior to beginning one or more other steps of the payment transaction, such as prior to sending a payment request to the payment credential of the sender or until a recipient accepts the payment amount.

According to some embodiments, after the predetermined amount of time passes, the system 100 may provide a notification to the client device 400 that the time has passed. For example, the system 100 may provide a message within the messaging thread 414 or within the messaging interface 412. Thus, the system 100 may inform the user that the payment is irreversible and can no longer be canceled.

In one or more embodiments, while validating or after validating the payment credentials of the user, the sender client device 400 can send the payment message to the recipient client device. The system 100 can present the payment amount 432 within the messaging thread 414 for both the sender and the recipient involved in the conversation. For example, FIG. 4H shows the payment amount 432 for the payment message in the messaging thread 414 between the sender and the recipient. To illustrate, the system 100 can present the payment amount 432 as a message within a time-dependent flow of the conversation of the messaging thread 414.

FIGS. 4I-4L illustrate a graphical user interface for the recipient client device 400a. FIG. 4I illustrates the messaging interface 412a at the recipient client device 400a after the sender has initiated the payment transaction to send a payment amount to the recipient. In one or more embodiments, the system 100 can notify the recipient that the sender has initiated the payment transaction. For example, the user interface manager 208 can show the payment amount in the messaging thread 414a of the messaging interface 412a associated with the sender's identity, and text content (e.g., "Sent from Messenger") in a payment message with the payment amount 432a. To illustrate, the user interface manager 208 can insert the payment amount 432a into a messaging thread 414a with other messages exchanged between the sender and the recipient. Additionally or alternatively, the user interface manager 208 can present the payment amount 432a in another manner (e.g., by providing a notification in a notification area of the recipients client device 400a or in an overlay of the messaging interface 412a).

In one or more embodiments, the user interface manager 208 can provide a confirmation request to the recipient to allow the recipient to accept the payment transaction (i.e., by selecting an element in the messaging interface such as an accept element 452). After the recipient accepts the payment transaction, the system 100 can complete the payment transaction and begin the process of transferring funds from the sender to the recipient. In an alternative example, the payment message can merely bring attention of the payment transaction to the recipient while the system 100 automatically processes and completes the payment transaction.

In one or more embodiments, when the recipient selects to accept the payment or after the recipient receives the payment message, the client application 202 can send a request to the network application 204 to determine if the recipient has a registered payment credential that supports same day processing of push-to-debit payment transactions. In the event the recipient is not associated with a registered payment account that supports same day transactions, a user interface manager 208 can present a credential user interface 434 that allows the recipient to establish an account and register a payment credential for a push-to-debit payment transaction (e.g., a debit card account), as shown in FIG. 4J. Alternatively, or additionally, a graphical interface can present a one-time payment option that allows a recipient to input payment information to facilitate a one-time push-to-debit payment, without requiring the sender to create an account.

Figures 4K, 4L:
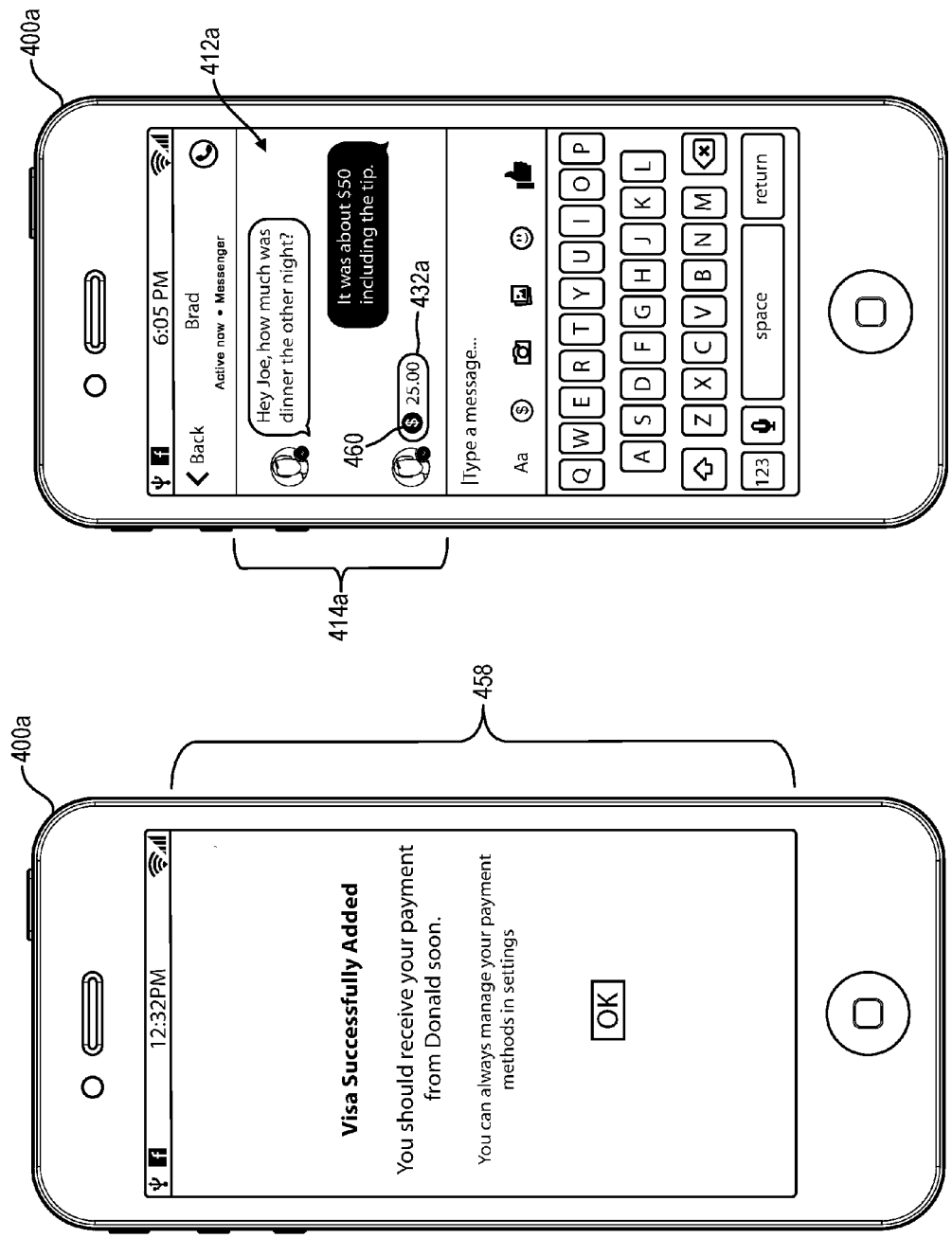

After the recipient enters a payment credential, the system 100 can complete the payment transaction. Specifically, the system 100 can complete the payment transaction by transferring funds from the sender to the recipient in a push-to-debit transaction. In some instances, transferring funds from the sender to the recipient can include transferring funds into a temporary or intermediate account associated with the recipient until the transaction is approved by the corresponding financial institutions, as described previously in relation to FIGS. 3A-3C. In alternative instances, completing the payment transaction can include directly transferring the funds into the destination debit card account entered by the recipient. As shown in FIG. 4K, after completing (or after the recipient selects to complete the payment transaction), the system 100 can display a payment completion message 458 notifying the recipient that the payment transaction is complete, and that the recipient should receive the payment within a certain timeframe. For example, the payment completion message 458 can notify the recipient that the recipient should receive the payment soon according to a substantially instant push-to-debit transaction.

In additional embodiments, the system 100 can select a payment credential from a plurality of payment credentials for the recipient. In particular, the system 100 can identify a plurality of payment credentials that the recipient has previously registered with the payment engine 206 and select an appropriate payment credential. For example, the system 100 can identify a first payment credential that does not support same day fund transfers and a second payment credential that supports same day fund transfers, and select the second payment credential for processing a same day push-to-debit payment transaction between the sender and the recipient. After selecting the appropriate payment credential, the system can complete the payment transaction (i.e., push the payment amount to the recipient's payment credential) and provide the recipient with the payment completion message 458.

In one or more embodiments, after closing the payment completion message 458 or otherwise completing the payment transaction, the system 100 can update the payment amount 432 (and any other text of the payment message) in the messaging thread 414 on the sender client device 400 and/or the messaging thread 414a of the recipient client device 400a to reflect that the system 100 has completed processing the payment transaction. For example, the user interface manager 208 can change certain characteristics of the payment message (which in this case comprises only the payment amount 432) in the messaging thread 414a. To illustrate, in FIG. 4L, the user interface manager 208 changes the color or shading of a payment icon 460 by the payment amount 432a in the payment message from light as shown in FIG. 4I to dark as shown in FIG. 4L. Additionally, or alternatively, the user interface manager 208 can change the position of the payment message in the messaging thread 414a, the border width of the payment message, the background color of the payment message, the size and font of the payment message, or any other characteristic of the payment message suitable for this purpose.

In one example, the user interface manager 208 can animate the payment amount when the payment amount is finalized, for example, by causing the payment amount to "bounce" within the messaging interface 412. When animating the payment amount, the user interface manager 208 can animate characters and/or images in the payment amount individually or collectively.

Additionally or alternatively, the user interface manager 208 can modify the appearance (e.g., animate the payment amount) until the one or more operations associated with the payment transaction are completed. For example, the user interface manager 208 can animate the payment amount until the recipient accepts the payment amount, the sender and/or the recipient enters credentials, or the system 100 completes the payment transaction and transfers the funds from the sender to the recipient. In additional or alternative embodiments, the user interface manager 208 can apply the modifications to the appearance of the payment amount for an amount of time once the payment amount is final. Additionally or alternatively, the user interface manager 208 can apply modifications to the appearance of the payment amount based on other criteria, such as when the payment transaction is complete, when the funds are available to the sender, or if the payment transaction fails.

FIGS. 1-4L, the corresponding text, and the examples, provide a number of different systems and devices for sending and receiving payments using an integrated electronic payment and messaging system. In addition to the foregoing, embodiments can be described in terms of flowcharts comprising acts and steps in a method for accomplishing a particular result. For example, FIGS. 5 and 6 illustrate flowcharts of exemplary methods in accordance with one or more embodiments.

Figure 5:
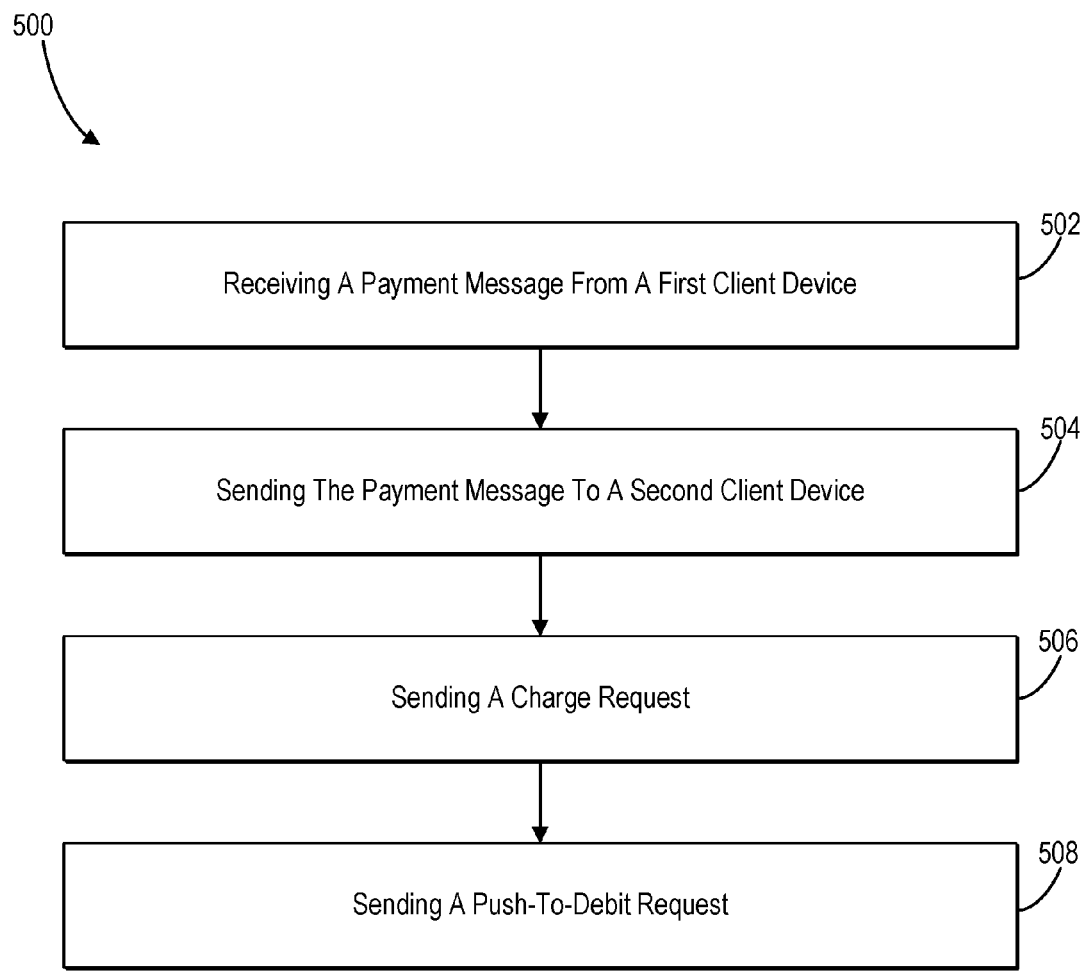
FIG. 5 illustrates a flow chart of a series of acts in a method of facilitating a same day payment transaction in accordance with one or more embodiments.
Figure 6:
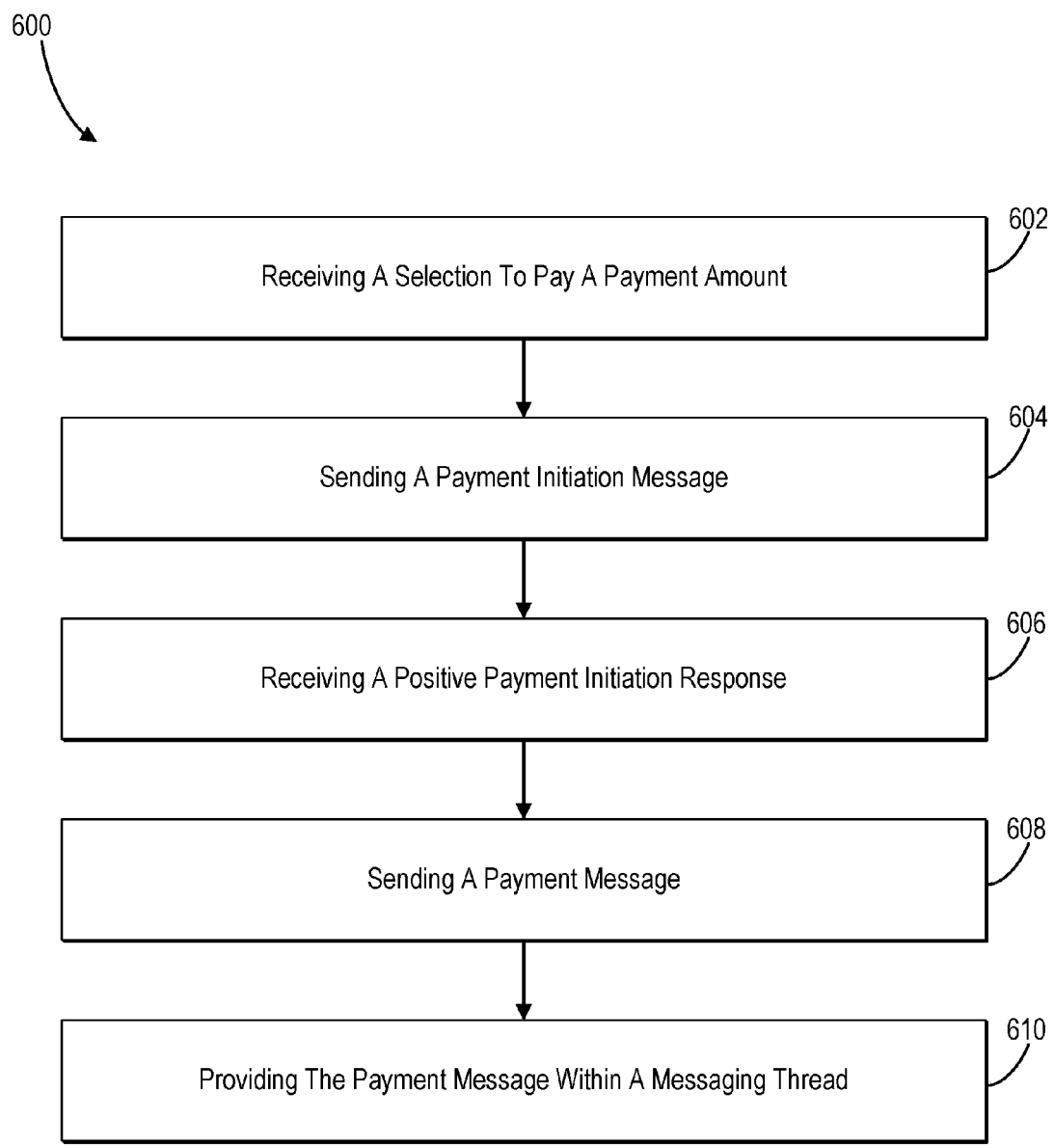
FIG. 6 illustrates a flow chart of a series of acts in a method of initiating a same day payment transaction in accordance with one or more embodiments.

FIG. 5 illustrates a flowchart of a method 500 of facilitating a same day payment transaction. The method 500 includes an act 502 of receiving a payment message from a first client device. For example, act 502 involves receiving, from a first client device 104a, 400 associated with a user, a payment message from the user directed to a co-user, the payment message including a payment amount associated with a payment transaction between the user and the co-user. Act 502 can additionally involve receiving the payment message at a first server that processes communications between co-users, and receiving the payment message at a second server that processes payment transactions between co-users. Also, act 502 can involve receiving the payment message in an electronic message associated with a messaging thread between the user and the co-user, the electronic message comprising a thread identifier for the messaging thread.

As part of act 502, or as an additional act, the method 500 can include receiving a payment initiation message directed from the user to the co-user indicating the payment credential of the user for transferring funds to the co-user. The method 500 can include sending, to the payment network 115, an authorization request for the payment credential of the user, and receiving, from the payment network 115, a positive authorization response for the payment credential of the user. The method 500 can also include performing a risk check for the user in association with a user messaging account of the user. For example, performing the risk check can involve determining a realness score associated with the user messaging account of the user. Additionally, or alternatively, the method 500 can include performing a risk check for the co-user in association with a user messaging account of the co-user.

The method 500 also includes an act 504 of sending the payment message to a second client device 104b, 400a. For example, act 504 involves sending the payment message to a second client device 104b, 400a associated with the co-user. To illustrate, act 504 can involve sending the payment message to the second client device 104b, 400a via the network application 204 on the server device(s) 108.

As part of act 504, or as an additional act, the method 500 can include writing the payment message to a messaging database comprising electronic messages associated with a messaging thread 414 between the user and the co-user. For example, the method 500 can include writing the payment message to the messaging database to while simultaneously sending the payment message to the second client device 104b, 400a.

Additionally, the method 500 includes an act 506 of sending a charge request. For example, act 506 involves sending, to a payment network 115, a charge request against a payment credential of the user for the payment amount of the payment message. To illustrate, act 506 can involve sending a push-to-debit request formatted for substantially instant processing of the charge request. For example, act 506 can involve sending a push-to-debit request formatted according to an application program interface for a particular payment network.

As part of act 506, or as an additional act, the method 500 can include identifying a plurality of payment credentials associated with the user, the plurality of payment credentials comprising a first payment credential that supports same day processing and a second payment credential that does not support same day processing. Additionally, the method 500 can include selecting the first payment credential for the payment amount from the user to the co-user, and transferring funds from the first payment account to a payment credential of the co-user, the payment credential of the co-user supporting same day processing.

As part of act 506, or as an additional act, the method 500 can include determining a payment method to use based on a risk associated with the user, a risk associated with the co-user, a cost to a payment engine, a cost to the user, a cost to the co-user, a reliability of the payment method, or an amount of time before funds transfer to a payment credential of the co-user.

The method 500 also includes an act 508 of sending a push-to-debit request. For example, act 508 involves sending, in response to the payment message, a push-to-debit request to the payment network to credit funds for the payment amount of the payment message to a debit card of the co-user, the push-to-debit request being formatted for same day processing. To illustrate, act 508 can involve sending the push-to-debit request using an application program interface for a specific payment network associated with the debit card of the co-user, the push-to-debit request being formatted for same day processing according to the application program interface.

As part of act 508, or as an additional act, the method 500 can include authorizing a withdrawal of the payment amount from the payment credential of the user, transferring funds for the payment amount from an intermediate account to a payment credential of the co-user in response to authorizing the withdrawal of the payment amount, and receiving a transfer of funds equal to the payment amount from the payment credential of the user to the intermediate account. For example, the method 500 can involve receiving a transfer of funds for the payment amount from a credit card of the user, and transferring funds for the payment amount to a debit card of the co-user.

As part of act 508, or as an additional act, the method 500 can include authorizing a withdrawal of the payment amount from a payment credential of the user, receiving, after authorizing the withdrawal of the payment amount and before transferring funds for the payment amount, a cancel payment request from the user in association with the payment transaction, and canceling the payment transaction between the user and the co-user.

FIG. 6 illustrates a flowchart of a series of acts in a method 600 of initiating a same day payment transaction. The method 600 includes an act 602 of receiving a selection to pay a payment amount. For example, act 602 involves receiving a selection by a user to pay a co-user a payment amount in a payment transaction between the user and the co-user. To illustrate, act 602 can involve receiving the selection of the payment amount from a payment interface 438 of a messaging application associated with a messaging thread 414 between the user and the co-user.

The method 600 also includes an act 604 of sending a payment initiation message. For example, act 604 involves sending, in response to the received selection, a payment initiation message directed from the user to the co-user indicating a payment credential of the user for transferring funds to the co-user. To illustrate, act 604 can involve sending the payment initiation message to a payment engine 206 to authorize the payment credential of the user. Additionally, act 604 can involve sending the payment message comprising a thread identifier associated with the messaging thread 414 between the user and the co-user.

The method 600 further includes an act 606 of receiving a positive payment initiation response. For example, act 606 involves receiving a positive payment initiation response indicating a validity of the payment credential of the user. To illustrate, act 606 can involve receiving a positive payment initiation response that indicates that the payment credential of the user is valid and supports same day processing of push-to-debit payment transactions.

Additionally, the method 600 includes an act 608 of sending a payment message. For example, act 608 involves sending, in response to the positive payment initiation response, a payment message comprising a push-to-debit request to credit funds for the payment amount of the payment transaction to a debit card of the co-user, the push-to-debit request being formatted for same day processing. To illustrate, act 608 can involve formatting the push-to-debit request for same day processing based on the payment credential of the user supporting same day processing.

As part of act 608, or as an additional act, the method 600 can include detecting a cancel payment request from the user within the messaging user interface 412, sending the cancel payment request to the one or more servers, and receiving a positive cancel payment response from the one or more servers. For example, the method 600 can include detecting the cancel payment request from the user after sending the payment message and within a predetermined time period.

The method 600 also includes an act 610 of providing the payment message within a messaging thread 414. For example, act 610 involves providing the payment message within a messaging thread between the user and a co-user, the messaging thread 414 being within a messaging user interface of a messaging application. To illustrate, act 610 can involve presenting the payment message within the payment messaging thread as an electronic message within a time-dependent flow of a conversation of the messaging thread 414.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

FIG. 7 illustrates a block diagram of exemplary computing device 700 that may be configured to perform one or more of the processes described above. One will appreciate that one or more computing devices such as the computing device 700 may implement the payment system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touchscreen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the system 100 can comprise a social networking system. A social-networking system may enable its users (such as persons or organizations) to interact with the system and with each other. As mentioned above, the system 100 can comprise a social networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 8:
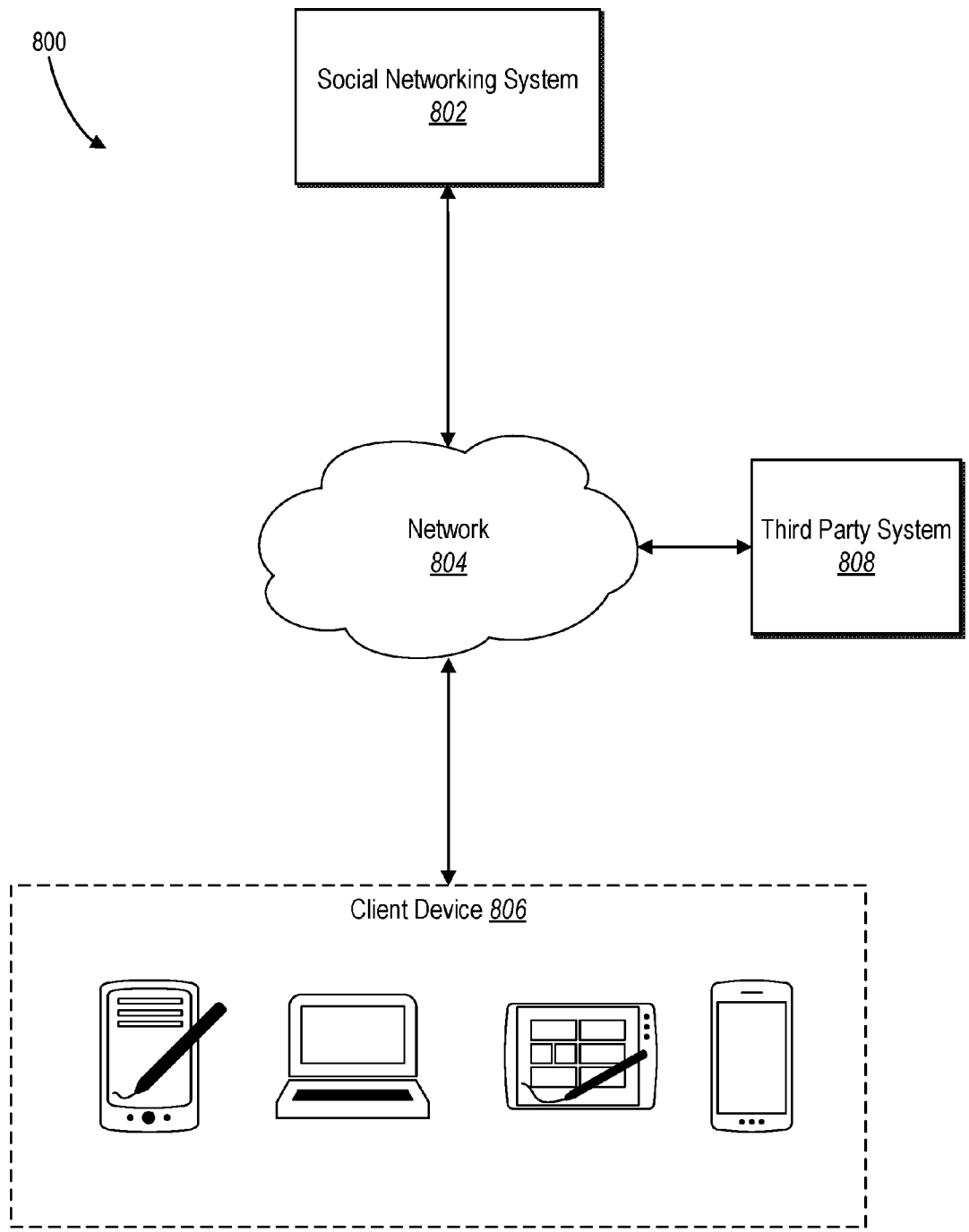
FIG. 8 illustrates an example network environment of a social-networking system in accordance with one or more embodiments.

FIG. 8 illustrates an example network environment 800 of a social-networking system. Network environment 800 includes a client system 806, a social-networking system 802, and a third-party system 808 connected to each other by a network 804. Although FIG. 8 illustrates a particular arrangement of client system 806, social-networking system 802, third-party system 808, and network 804, this disclosure contemplates any suitable arrangement of client system 806, social-networking system 802, third-party system 808, and network 804. As an example and not by way of limitation, two or more of client system 806, social-networking system 802, and third-party system 808 may be connected to each other directly, bypassing network 804. As another example, two or more of client system 806, social-networking system 802, and third-party system 808 may be physically or logically co-located with each other in whole or in part. Moreover, although FIG. 8 illustrates a particular number of client systems 806, social-networking systems 802, third-party systems 808, and networks 804, this disclosure contemplates any suitable number of client systems 806, social-networking systems 802, third-party systems 808, and networks 804. As an example and not by way of limitation, network environment 800 may include multiple client system 806, social-networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client system 806, social-networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client system 806 may be an electronic device including hardware, software, or embedded logic components or a combination of two or more such components and capable of carrying out the appropriate functionalities implemented or supported by client system 806. As an example and not by way of limitation, a client system 806 may include any of the computing devices discussed above in relation to FIG. 7. A client system 806 may enable a network user at client system 806 to access network 804. A client system 806 may enable its user to communicate with other users at other client systems 806.

In particular embodiments, client system 806 may include a web browser 932, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client system 806 one or more Hyper Text Markup Language (HTML) files responsive to the HTTP request. Client system 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 802 may be a network-addressable computing system that can host an online social network. Social-networking system 802 may generate, store, receive, and send social-networking data, such as, for example, user-profile data, concept-profile data, social-graph information, or other suitable data related to the online social network. Social-networking system 802 may be accessed by the other components of network environment 800 either directly or via network 804. In particular embodiments, social-networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 806, a social-networking system 802, or a third-party system 808 to manage, retrieve, modify, add, or delete, the information stored in data store.

In particular embodiments, social-networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 802 may provide users of the online social network the ability to communicate and interact with other users. In particular embodiments, users may join the online social network via social-networking system 802 and then add connections (e.g., relationships) to a number of other users of social-networking system 802 whom they want to be connected to. Herein, the term "friend" may refer to any other user of social-networking system 802 with whom a user has formed a connection, association, or relationship via social-networking system 802.

In particular embodiments, social-networking system 802 may provide users with the ability to take actions on various types of items or objects, supported by social-networking system 802. As an example and not by way of limitation, the items and objects may include groups or social networks to which users of social-networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 802 or by an external system of third-party system 808, which is separate from social-networking system 802 and coupled to social-networking system 802 via a network 804.

In particular embodiments, social-networking system 802 may be capable of linking a variety of entities. As an example and not by way of limitation, social-networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social-networking system 802. In particular embodiments, however, social-networking system 802 and third-party systems 808 may operate in conjunction with each other to provide social-networking services to users of social-networking system 802 or third-party systems 808. In this sense, social-networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client system 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 802 also includes user-generated content objects, which may enhance a user's interactions with social-networking system 802. User-generated content may include anything a user can add, upload, send, or "post" to social-networking system 802. As an example and not by way of limitation, a user communicates posts to social-networking system 802 from a client system 806. Posts may include data such as status updates or other textual data, location information, photos, videos, links, music or other similar data or media. Content may also be added to social-networking system 802 by a third-party through a "communication channel," such as a newsfeed or stream.

In particular embodiments, social-networking system 802 may include a variety of servers, sub-systems, programs, modules, logs, and data stores. In particular embodiments, social-networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 802 may also include suitable components such as network interfaces, security mechanisms, load balancers, failover servers, management-and-network-operations consoles, other suitable components, or any suitable combination thereof. In particular embodiments, social-networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 802 to one or more client systems 806 or one or more third-party system 808 via network 804. The web server may include a mail server or other messaging functionality for receiving and routing messages between social-networking system 802 and one or more client systems 806. An API-request server may allow a third-party system 808 to access information from social-networking system 802 by calling one or more APIs. An action logger may be used to receive communications from a web server about a user's actions on or off social-networking system 802. In conjunction with the action log, a third-party-content-object log may be maintained of user exposures to third-party-content objects. A notification controller may provide information regarding content objects to a client system 806. Information may be pushed to a client system 806 as notifications, or information may be pulled from client system 806 responsive to a request received from client system 806. Authorization servers may be used to enforce one or more privacy settings of the users of social-networking system 802. A privacy setting of a user determines how particular information associated with a user can be shared. The authorization server may allow users to opt in to or opt out of having their actions logged by social-networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client systems 806 associated with users. Advertisement-pricing modules may combine social information, the current time, location information, or other suitable information to provide relevant advertisements, in the form of notifications, to a user.

Figure 9:
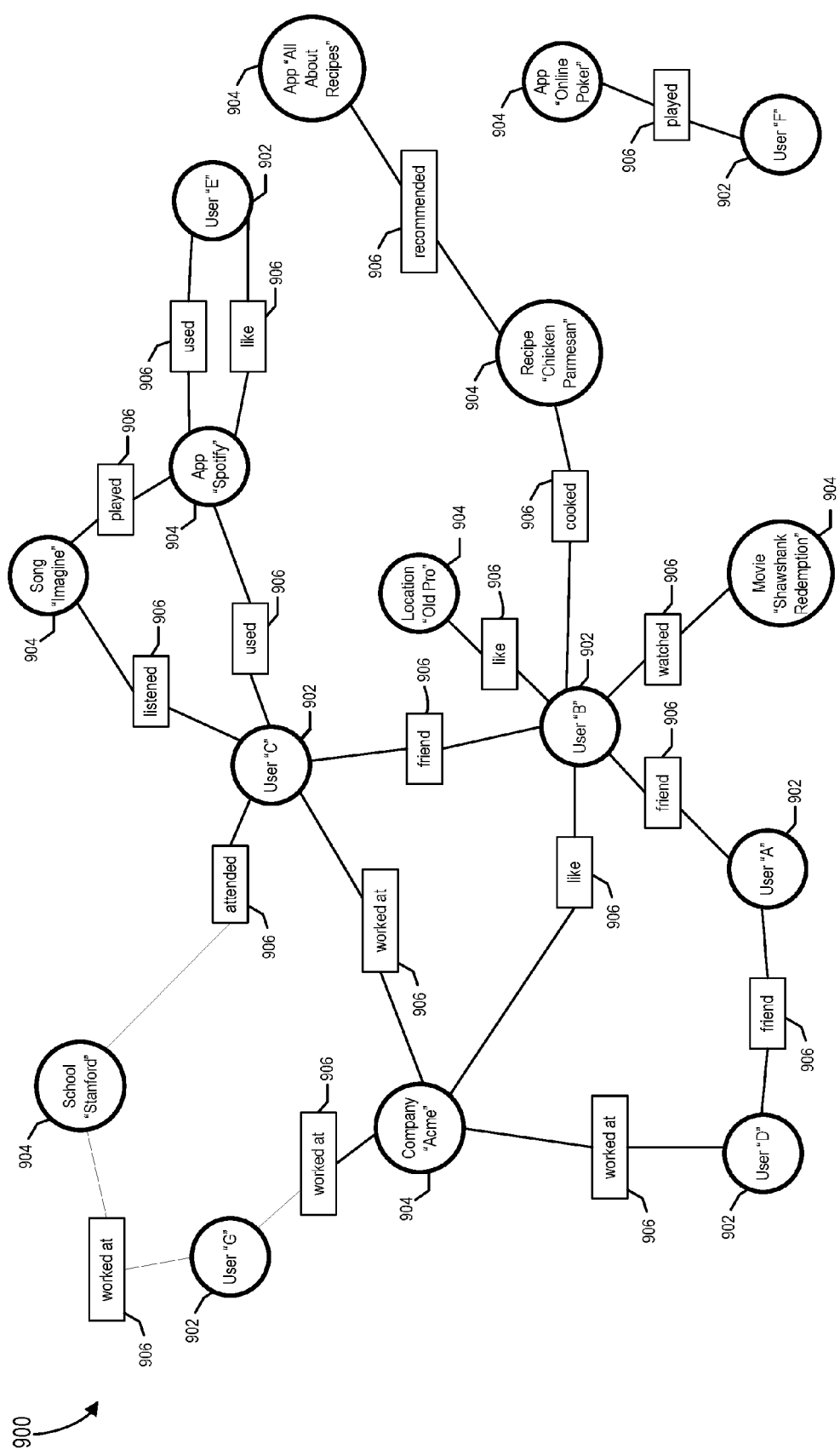
FIG. 9 illustrates an example social graph for a social-networking system in accordance with one or more embodiments.

FIG. 9 illustrates example social graph 900. In particular embodiments, social-networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 802, client system 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social-networking system 802. As an example and not by way of limitation, a user may be an individual (human user), an entity (e.g., an enterprise, business, or third-party application), or a group (e.g., of individuals or entities) that interacts or communicates with or over social-networking system 802. In particular embodiments, when a user registers for an account with social-networking system 802, social-networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 802. In particular embodiments, a user node 902 may be associated with information provided by a user or information gathered by various systems, including social-networking system 802. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social-networking system 802 or on an external server, such as a web-application server; real or intellectual property (such as, for example, a sculpture, painting, movie, game, song, idea, photograph, or written work); a game; an activity; an idea or a theory; another suitable concept; or two or more such concepts. A concept node 904 may be associated with information of a concept provided by a user or information gathered by various systems, including social-networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 802. Profile pages may also be hosted on third-party web sites associated with a third-party server 808. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 806 to send to social-networking system 802 a message indicating the user's action. In response to the message, social-networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 802 may send a "friend request" to the second user. If the second user confirms the "friend request," social-networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 802 may create an edge 906 between a user node 902 and a concept node 904 in social graph 900. As an example and not by way of limitation, a user viewing a concept-profile page (such as, for example, by using a web browser or a special-purpose application hosted by the user's client system 806) may indicate that he or she likes the concept represented by the concept node 904 by clicking or selecting a "Like" icon, which may cause the user's client system 806 to send to social-networking system 802 a message indicating the user's liking of the concept associated with the concept-profile page. In response to the message, social-networking system 802 may create an edge 906 between user node 902 associated with the user and concept node 904, as illustrated by "like" edge 906 between the user and concept node 904. In particular embodiments, social-networking system 802 may store an edge 906 in one or more data stores. In particular embodiments, an edge 906 may be automatically formed by social-networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 802) or RSVP (e.g., through social-networking system 802) to an event associated with the advertisement. In addition or as an alternative, an advertisement may include social-networking-system context directed to the user. As an example and not by way of limitation, an advertisement may display information about a friend of the user within social-networking system 802 who has taken an action associated with the subject matter of the advertisement.

In particular embodiments, social-networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 802 may calculate a coefficient based on a user's actions. Social-networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social-networking system 802 may analyze a user's actions to determine whether one or more of the actions indicate an affinity for subject matter, content, other users, and so forth. As an example and not by way of limitation, if a user may make frequently posts content related to "coffee" or variants thereof, social-networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 802 may calculate a coefficient based on the type of relationship between particular objects. Referencing the social graph 900, social-networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 802 may determine that the user has a higher coefficient with respect to the first photo than the second photo because having a tagged-in-type relationship with content may be assigned a higher weight and/or rating than having a like-type relationship with content. In particular embodiments, social-networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 802 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 806 of the user). A first user may be more interested in other users or concepts that are closer to the first user. As an example and not by way of limitation, if a user is one mile from an airport and two miles from a gas station, social-networking system 802 may determine that the user has a higher coefficient for the airport than the gas station based on the proximity of the airport to the user.

In particular embodiments, social-networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 802 may provide information that is relevant to user's interests and current circumstances, increasing the likelihood that they will find such information of interest. In particular embodiments, social-networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social-networking system 802 may calculate the coefficient (or access the coefficient information if it has previously been calculated and stored). In particular embodiments, social-networking system 802 may measure an affinity with respect to a particular process. Different processes (both internal and external to the online social network) may request a coefficient for a particular object or set of objects. Social-networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/976,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social-networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 802 may send a request to the data store for the object. The request may identify the user associated with the request and may only be sent to the user (or a client system 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   receiving, at one or more servers from a first client device associated with a user, a payment message from the user directed to a co-user, the payment message generated by the first client device and including a payment amount associated with a payment transaction between the user and the co-user;
   sending, by the one or more servers, the payment message to a second client device associated with the co-user;
   sending, by the one or more servers to a payment network, a charge request against a payment credential of the user for the payment amount of the payment message;
   formatting, by the one or more servers, a push-to-debit request to credit funds for the payment amount of the payment message to a debit card of the co-user in a same day transaction; and
   sending, by the one or more servers in response to the payment message, the push-to-debit request to the payment network to credit funds for the payment amount of the payment message to the debit card of the co-user.

2. The method as recited in claim 1, wherein formatting the push-to-debit request comprises formatting the push-to-debit request to include a peer-to-peer payment request to transfer funds for the payment amount from a payment credential of the user to an account linked to the debit card of the co-user in a same day transaction.

3. The method as recited in claim 2, further comprising:
   identifying a plurality of payment methods for sending the payment amount to the co-user;
   performing a risk check to determine a risk associated with the user;
   determining that the risk associated with the user meets a risk threshold; and
   selecting the first payment method based on the risk associated with the user meeting the risk threshold, the first payment method comprising a push-to-debt transaction not attached to a previous funding transaction posted to the account linked to the debit card of the co-user.

4. The method as recited in claim 1, further comprising:
   identifying a plurality of payment credentials associated with the co-user, the plurality of payment credentials comprising the debit card that supports same day processing by a payment transfer that is not attached to a previous funding transaction and a second payment credential that does not support same day processing;
   selecting the debit card for receiving the payment amount from the user to the co-user; and
   transferring funds from the payment credential of the user to the debit card of the co-user.

5. The method as recited in claim 1, further comprising:
   identifying a plurality of payment methods for sending the payment amount to the co-user;
   determining a processing time to fund the payment amount for each payment method of the plurality of payment methods; and
   associating a cost with each payment method based on the determined processing times.

6. The method as recited in claim 5, further comprising:
   identifying a first payment method that supports same day processing by a payment transfer that is not attached to a previous funding transaction and a second payment method that does not support same day processing;
   determining that a first processing time associated with the first payment method is faster than a second processing time associated with the second payment method; and
   associating a first cost with the first payment method and a second cost with the second payment method, wherein the first cost is higher than the second cost based on the first processing time being faster than the second processing time.

7. The method as recited in claim 6, further comprising:
receiving a selection of the first payment method for the payment transaction; and
sending a charge request against the first payment credential for the first cost associated with the first payment method in response to the received selection of the first payment method.

8. The method as recited in claim 1, further comprising:
authorizing a withdrawal of the payment amount from the payment credential of the user;
receiving, after authorizing the withdrawal of the payment amount and before transferring funds for the payment amount, a cancel payment request from the user; and
canceling the payment transaction between the user and the co-user.

9. The method as recited in claim 1, further comprising writing, by the one or more servers, the payment message to a messaging database comprising electronic messages associated with a messaging thread between the user and the co-user.

10. A system comprising:
at least one processor; and
at least one non-transitory computer readable storage medium storing instructions thereon, that, when executed by the at least one processor, cause the system to:
receive, from a first client device associated with a user, a payment message from the user directed to a co-user, the payment message generated by the first client device and including a payment amount associated with a payment transaction between the user and the co-user;
send the payment message to a second client device associated with the co-user;
send, to a payment network, a charge request against a payment credential of the user for the payment amount of the payment message;
format a push-to-debit request to credit funds for the payment amount of the payment message to a debit card of the co-user in a same day transaction; and
send, in response to the payment message, the push-to-debit request to the payment network to credit funds for the payment amount of the payment message to the debit card of the co-user.

11. The system as recited in claim 10, wherein the push-to-debit request comprises a payment request that is not attached to a previous funding transaction posted to an account linked to the debit card of the co-user.

12. The system as recited in claim 10, further comprising instructions that, when executed by the at least one processor, cause the system to:
identify a plurality of payment methods for sending the payment amount to the co-user;
determine a processing time to fund the payment amount for each payment method of the plurality of payment methods; and
associate a cost with each payment method based on the determined processing times.

13. The system as recited in claim 12, further comprising instructions that, when executed by the at least one processor, cause the system to:
identify a first payment method that supports same day processing by a payment transfer that is not attached to a previous funding transaction and a second payment method that does not support same day processing;
determine that a first processing time associated with the first payment method is faster than a second processing time associated with the second payment method; and
associate a first cost with the first payment method and a second cost with the second payment method, wherein the first cost is higher than the second cost based on the first processing time being faster than the second processing time.

14. The system as recited in claim 12, further comprising instructions that, when executed by the at least one processor, cause the system to:
receive a selection of the first payment method for the payment transaction; and
send a charge request against the first payment credential for the first cost associated with the first payment method in response to the received selection of the first payment method.

15. The system as recited in claim 12, further comprising instructions that, when executed by the at least one processor, cause the system to:
perform a risk check to determine a risk associated with the user;
determine that the risk associated with the user meets a risk threshold; and
select the first payment method based on the risk associated with the user meeting the risk threshold.

16. The system as recited in claim 10, further comprising instructions that, when executed by the at least one processor, cause the system to:
authorize a withdrawal of the payment amount from the payment credential of the user;
receive, after authorizing the withdrawal of the payment amount and before transferring funds for the payment amount, a cancel payment request from the user; and
cancel the payment transaction between the user and the co-user.

17. The system as recited in claim 10, further comprising instructions that, when executed by the at least one processor, cause the system to:
determine that the user has previously performed a threshold number of payment transactions; and
provide a discount for a cost associated with processing the payment transaction between the user and the co-user based on the determination that the user has previously performed the threshold number of payment transactions.

18. The system as recited in claim 10, further comprising instructions that, when executed by the at least one processor, cause the system to write the payment message to a messaging database comprising electronic messages associated with a messaging thread between the user and the co-user in parallel with sending the payment message to the second client device.

19. A method comprising:
receiving, by at least one processor of a client device of a user, a selection by the user to pay a co-user a payment amount in a payment transaction between the user and the co-user;
generating, by the at least one processor in response to the received selection, a payment initiation message directed from the user to the co-user indicating a payment credential of the user for transferring funds to the co-user;
sending the payment initiation message to one or more servers;
receiving, from the one or more servers, a positive payment initiation response indicating a validity of the payment credential of the user;

formatting, by the at least one processor, a push-to-debit request to credit for the payment amount of the payment transaction to a debit card of the co-user in a same day transaction;

sending, to the one or more servers in response to the positive payment initiation response, a payment message comprising the push-to-debit request to credit funds for the payment amount of the payment transaction to the debit card of the co-user; and providing, by the at least one processor, the payment message within a messaging thread between the user and a co-user, the messaging thread being within a messaging user interface of a messaging application.

20. The method as recited in claim 19, wherein the push-to-debit request comprises a payment request that is not attached to a previous funding transaction posted to an account linked to the debit card of the co-user.

* * * * *